US006804473B2

(12) United States Patent
Nakamura et al.

(10) Patent No.: US 6,804,473 B2
(45) Date of Patent: Oct. 12, 2004

(54) IMAGE FORMING APPARATUS

(75) Inventors: Tomokazu Nakamura, Chiba (JP); Masaaki Inoo, Tokyo (JP); Shinsuke Ubayashi, Chiba (JP); Yusuke Obuchi, Chiba (JP); Yoshiyuki Nakajima, Ibaraki (JP); Atsuteru Oikawa, Chiba (JP); Hitoshi Kato, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/447,158

(22) Filed: May 29, 2003

(65) Prior Publication Data
US 2003/0235328 A1 Dec. 25, 2003

(30) Foreign Application Priority Data
Jun. 12, 2002 (JP) ........................................ 2002-171948

(51) Int. Cl.[7] ..................... G03G 15/00; G03G 21/00; B65H 7/02
(52) U.S. Cl. ................. 399/16; 399/18; 399/361; 399/372; 399/394; 399/395; 399/405; 399/406; 271/265.02; 271/265.01; 271/301; 271/303; 271/296
(58) Field of Search ....................... 399/16, 18, 361, 399/372, 394, 395, 405, 406; 271/265.01, 265.02, 301, 303, 296

(56) References Cited
U.S. PATENT DOCUMENTS

| | | | |
|---|---|---|---|
| 5,478,066 A | 12/1995 | Yoshida et al. ............... 271/12 |
| 5,850,582 A | 12/1998 | Inoo et al. ...................... 399/8 |
| 5,881,351 A | * 3/1999 | Shimotoso et al. .......... 399/377 |
| 5,940,659 A | * 8/1999 | Rieck ........................... 399/124 |
| 6,256,473 B1 | * 7/2001 | Kamanuma et al. ......... 399/367 |
| 6,661,982 B2 | * 12/2003 | Koike ........................... 399/82 |
| 2002/0109289 A1 | 8/2002 | Oikawa ....................... 271/298 |
| 2003/0038418 A1 | 2/2003 | Isemura et al. ........... 271/10.01 |
| 2003/0044186 A1 | 3/2003 | Kato et al. ..................... 399/16 |
| 2003/0190169 A1 | * 10/2003 | Shibaki ......................... 399/21 |

* cited by examiner

Primary Examiner—Andrew H. Hirshfeld
Assistant Examiner—Marvin P Crenshaw
(74) Attorney, Agent, or Firm—Fitzpatrick, Cella, Harper & Scinto

(57) ABSTRACT

An image forming apparatus has an abnormality detecting device for detecting the abnormality of the sheet, an abnormal sheet containing portion for containing therein the sheet of which the abnormality has been detected, a normal sheet containing portion for temporarily containing therein a normal sheet of which the abnormality has not been detected, and a controlling portion for controlling the image forming portion so that the abnormal sheet is contained in the abnormal sheet containing portion, and that an image formed on the abnormal sheet may be formed on a predetermined subsequent sheet subsequent to the abnormal sheet. The normal sheet between the abnormal sheet and the predetermined subsequent sheet is contained in the normal sheet containing portion after the abnormal sheet is contained in the abnormal sheet containing portion, and the normal sheet contained in the normal sheet containing portion is delivered after the predetermined subsequent sheet has been delivered.

17 Claims, 28 Drawing Sheets

P (i, j)

IMAGE DATA STORED IN STORAGE DEVICE

B (i, j)

IMAGE DATA READ BY READER OF INSPECTION DEVICE

TRAVELING DIRECTION

TRAVELING DIRECTION

INSPECTION HAS BECOME NG.

FIFTH COPY AND TENTH COPY OF JOB 1.

CURLED SELVAGE IS PRESUMED.

RECOVERY OPERATION IS IN EXECUTION.

INSPECTION HAS BECOME NG.

TWENTY-FIFTH COPY AND THIRTIETH COPY OF JOB 3.

SKEW-FEED OF SHEET IS PRESUMED.

RECOVERY OPERATION IS IN EXECUTION.

INSPECTION NG HISTORY

| JOB 01 | FIFTH COPY | TENTH COPY | CURLED SELVAGE |
| JOB 03 | TWENTY-FIFTH COPY | THIRTIETH COPY | SKEW-FEED OF SHEET |
| JOB 03 | TWENTY-SEVENTH COPY | THIRD COPY | SKEW-FEED OF SHEET |
| JOB 18 | SECOND COPY | THIRTIETH COPY | SMEAR |
| JOB 95 | FIFTH COPY | FIRST COPY | COLOR OF SHEET |

TRAVELING DIRECTION

TRAVELING DIRECTION

FIG. 13

RECOVERY LIMITATION

PLEASE INPUT NUMBER OF TIMES FOR LIMITING RECOVERY

CONTINUOUS NG NUMBER OF TIMES          : _5_ TIMES

SAME TYPE NG NUMBER OF TIMES  SKEW-FEED      : ___ TIMES

CURLED SELVAGE : ___ TIMES

DENSITY        : _10_ TIMES

IMAGE FORMING APPARATUS

BACKGROUND OF THE INVENTION

1. Field of the Invention

The invention relates to an image forming apparatus, and particularly to an image forming apparatus provided with an inspecting apparatus for inspecting sheets.

2. Description of Related Art

Among image forming apparatuses such as copying machines, there is one provided with a sheet treating apparatus such as a finisher for treating a sheet having an image formed thereon, and adapted to effect working as a bundle, i.e., such treatments as a bundle delivery treatment, a stapling treatment, a bending treatment, a binding treatment and a sorting treatment by the sheet treating apparatus.

Also, an image forming apparatus provided with such a sheet treating apparatus is provided with such modes as a top cover mode and a slip sheet mode, and is controlled so that is may be possible to insert as the top page, the final page or an intermediate page a sheet contained in a cassette provided in an image forming apparatus main body, or a sheet feeding tray. The treatment of this inserted sheet is a mere sheet transporting operation and therefore, both of the order number of insertion (location) and the number of inserted sheets of sheets inserted into each bundle can be set arbitrarily.

Now, in the image forming apparatus provided with such a conventional sheet treating apparatus, there is the possibility of occurrence of various abnormal sheets such as image abnormality by density abnormality, color misregister or skew-feed of a sheet, the inconvenience of a sheet itself such as wrinkles or curled selvage, and the wrong colors of a sheet by erroneous setting of the sheet.

However, when such an abnormal sheet occurs, judgment as to whether the sheet is normal or a normal image is formed on the sheet is not done and therefore, for example, even when an image transferred to the sheet contacts with a structure on a movement path and is disturbed thereby before it is completely fixed, the sheet is intactly delivered to the sheet treating apparatus such as a finisher.

When a binding treatment or the like is effected on a sheet bundle including the sheet thus delivered to the sheet treating apparatus, a book is abnormally handled due to the presence of an abnormal sheet. In this case, not only the abnormal sheet but also the other normal sheets came to nothing.

SUMMARY OF THE INVENTION

So, the present invention has been made in view of such existing circumstances, and has as its object to provide an image forming apparatus which, when an abnormal sheet occurs, can eliminate the abnormal sheet, and can automatically effect the recovery of the eliminated abnormal sheet.

BRIEF DESCRIPTION OF THE DRAWINGS

FIGS. 11A, 11B and 11C show the contents displayed on an operating portion when the inspection by the inspection device has become N.G.

FIG. 13 shows the setting of the limitation of the number of times for the recovery operation performed when the inspection by the inspection device has become N.G.

DESCRIPTION OF THE PREFERRED EMBODIMENTS

Some embodiments of the present invention will hereinafter be described in detail with reference to the drawings. However, the dimensions, materials, shapes, relative arrangements, etc. of constituent parts described in these embodiments, unless otherwise specified, are not intended to restrict the scope of this invention thereto.

Figure 2:
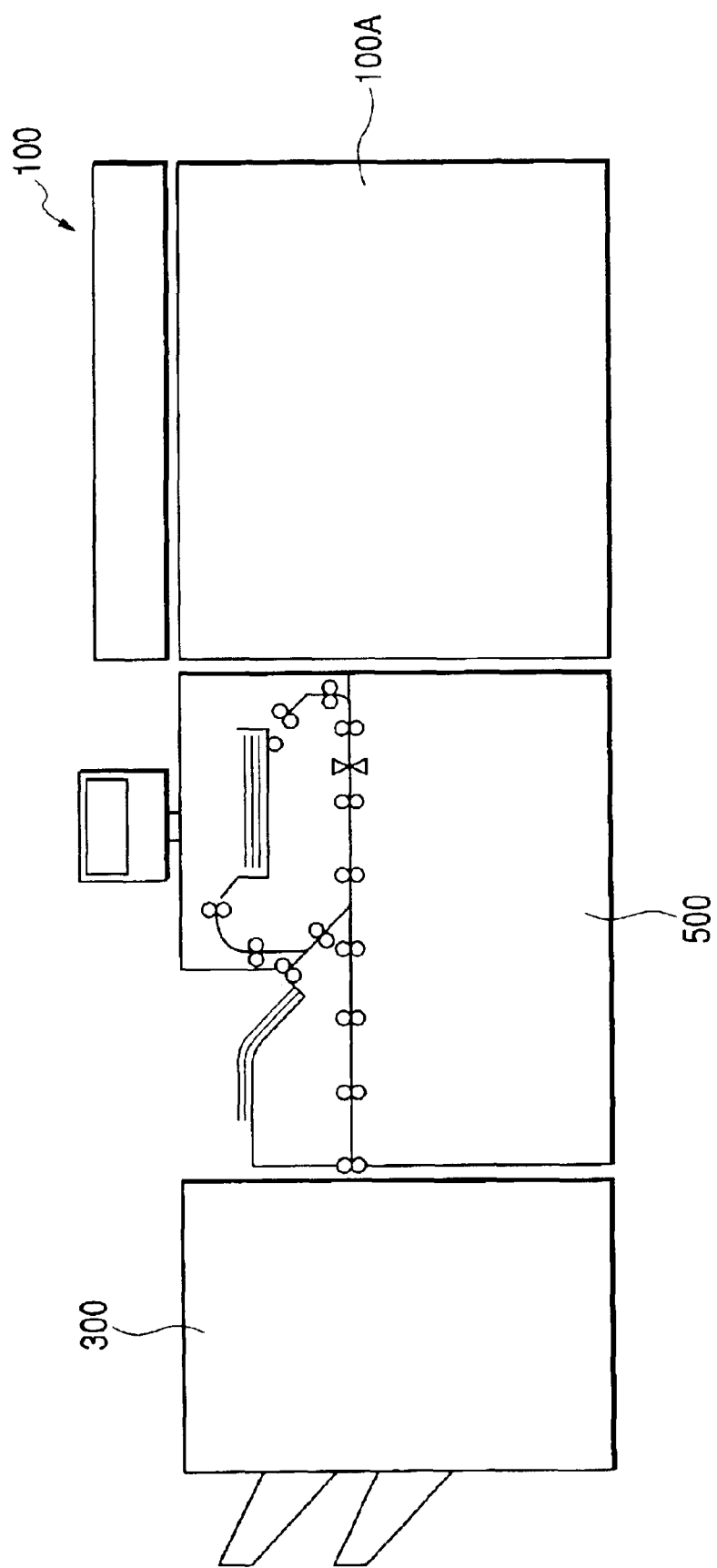
FIG. 2 is a schematic view of a copying machine provided with the inspection device of FIG. 1 and a sheet treating apparatus.

Referring to FIG. 2 which schematically shows the construction of a copying machine which is an example of an image forming apparatus according to a first embodiment of the present invention, the reference numeral 100 designates the copying machine, the reference character 100A denotes a copying machine main body, the reference numeral 300 designates a sheet treating apparatus, and the reference numeral 500 denotes an inspection device. The copying machine main body 100A, the sheet treating apparatus 300 and the inspection device 500 will now be described.

Figure 3:
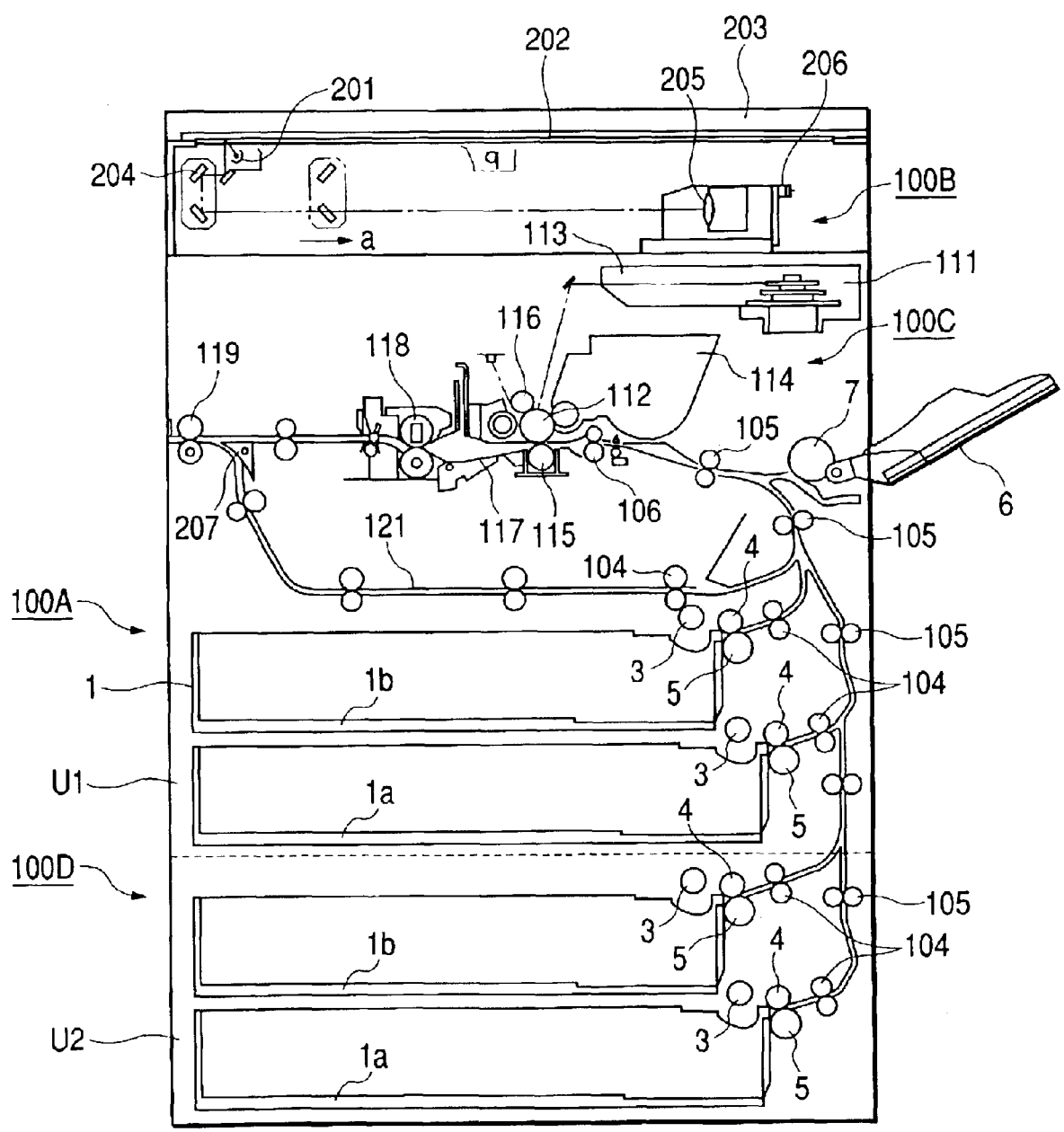
FIG. 3 schematically shows the construction of the main body of the copying machine.

Reference is first had to FIG. 3 to schematically describe the construction of the copying machine main body 100A along the flow of a sheet. A scanner portion 100B which is image reading means for reading the image information of a book original is provided in the upper portion of the copying machine main body 100A. Also, an image forming portion 100C is provided below the scanner portion 100B, and a sheet deck 100D is provided in the lower portion of the image forming portion 100C.

The scanner portion 100B is comprised of a scanning system light source 201, a platen glass plate 202, an original pressure plate 203 openable and closable relative to the platen glass plate 202, a mirror 204, a lens 205, a light receiving element (photoelectric conversion element) 206 and an image processing portion (not shown).

Design is made such that when image information is to be read, a book original such as a book or a sheet-like original such as thick paper or curled paper is placed on the platen glass plate 202 with its original surface facing down, whereafter the back of the original is pressed by the original pressure plate 203 and is set in its stationary state, whereafter a reading start key, not shown, is depressed, whereupon the scanning system light source 201 scans the lower portion of the platen glass plate 202 in the direction of arrow a to thereby read the image information of the original surface.

The image information of the original read by the scanning system light source 201 is processed by the image processing portion, whereafter it is converted into an electrical signal and is transmitted to a laser scanner 111 provided in the image forming portion 100C which will be described later.

The copying machine main body 100A of the present embodiment functions as a copying machine if the processing signal of the image processing portion is inputted to the laser scanner 111, and functions as a printer if the output signal of a computer, not shown, is inputted to the laser scanner. It is also designated to function as a facsimile apparatus if it receives a signal from other facsimile apparatus or transmits the signal of the image processing portion to other facsimile apparatus.

Also, the image forming portion 100C has a photosensitive drum 112, an image writing optical system 113, a developing device 114, a transfer charger 115 and a primary charger 116, and in case of image forming, the surface of the photosensitive drum 112 is first uniformly charged by the primary charger 116, and a laser beam corresponding to image information emitted from the laser scanner 111 is scanned on the surface of the photosensitive drum 112 by the image writing optical system 113, whereby a latent image is formed.

Next, this latent image is developed by the developing device 114 to thereby form a toner image on the photosensitive drum 112, whereafter the toner image is transferred to a first side of a sheet transported in synchronism with the rotation of the photosensitive drum 112 by registration rollers 106, by the transfer charger 115.

Next, the sheet on which the toner image has been thus formed is transported to a fixing device 118 by a transporting portion 117, whereafter it is heated and pressed at the fixing device 118 and the toner image thereon is fixed on the surface of the sheet, whereafter the sheet is delivered toward the inspection device 500 by delivery rollers 119.

When images are to be formed on both sides of the sheet, the sheet delivered from the fixing device 118 is nipped by the delivery rollers 119, and at a point of time whereat the trailing edge of the sheet has passed a branch-off point 207, the rotation of the delivery rollers 119 is reversed. Thereby, the sheet is once placed on a sheet two-side tray 121, and thereafter is transported by transport rollers 104 and 105 and arrives at the registration rollers 106, whereafter an image is formed on a second side of the reversed sheet in the same manner as previously described, whereafter the sheet is delivered.

Also, the sheet deck 100D has two feeding units U1 and U2 each having two sheet cassettes 1a and 1b. In case of image forming, sheets contained in the cassettes 1a and 1b are paid away by pickup rollers 3 which are feeding rotary members.

The sheets thus paid away are separated and fed one by one by the cooperation between feed rollers 4 and retard rollers 5, whereafter the sheet is transported to the registration rollers 106 by the transport rollers 104 and 105. Thereafter, the sheet is fed to the image forming portion 100C in synchronism with the already described image forming operation by the registration rollers 106, and a toner image is transferred to the first side of the sheet by the transfer charger 115.

The construction of the sheet treating apparatus 300 will now be schematically described with reference to FIG. 4.

Figure 4:
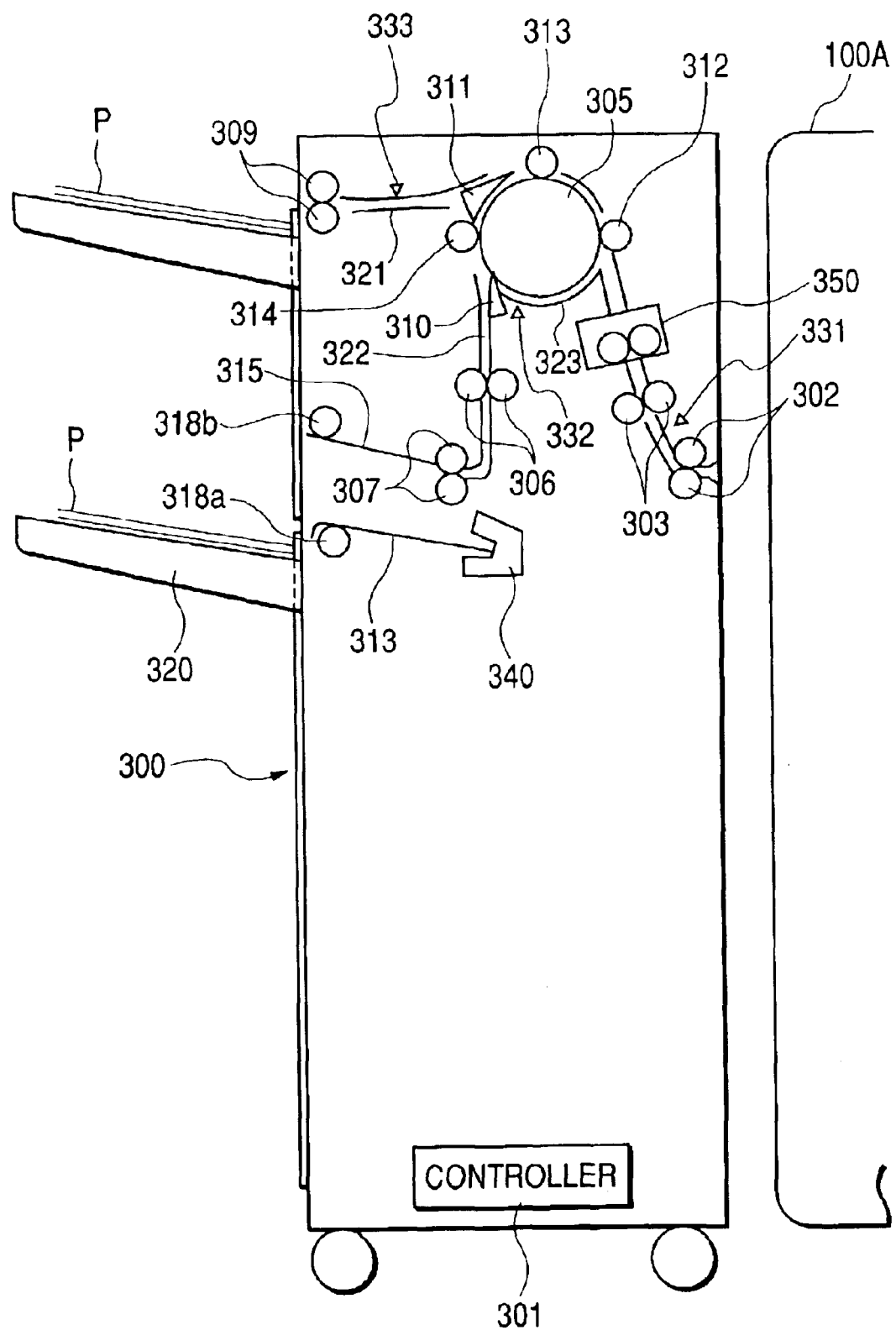
FIG. 4 schematically shows the construction of the sheet treating apparatus.

As shown in FIG. 4, the sheet treating apparatus 300 is provided with a pair of inlet rollers 302 for receiving the sheet delivered from the inspection device 500 which will be described later, and a pair of transport rollers 303 provided downstream of the pair of inlet rollers 302, and a sheet detecting sensor 331 is provided between the pair of inlet rollers 302 and the pair of transport rollers 303.

A punch unit 350 is provided downstream of the pair of transport rollers 303, and a large transport roller 305 is disposed downstream of the punch unit 350, and pressure runners 312, 313 and 314 for pressing the sheet against the large transport roller 305 to thereby transport the sheet are disposed around the large transport roller 305.

Also, a non-sort path 321, a sort path 322 and a buffer path 323 for temporarily storing the sheet therein are provided downstream of the large transport roller 305. The non-sort path 321 and the sort path 322 are adapted to be changed over by a first changeover flapper 311, and the sort path 322 and the buffer path 323 are adapted to be changed over by a second changeover flapper 310 disposed at the entrance of the sort path 322.

Transport rollers 306 are provided in the sort path 322, and an intermediate tray (hereinafter referred to as the treating tray) 313 as a stacking tray is disposed downstream of the sort path 322, and design is made such that the temporary accumulation of the sheets, or the alignment to the sheets, the stapling of the sheets, etc. are effected on the treating tray 313.

Further, delivery rollers 307 for delivering the sheet onto the treating tray 313 is disposed on the exit side of the sort path 322, and an upper bundle delivery roller 318b supported by a rockable guide 315 and a lower bundle delivery roller 318a supported by the treating tray 313 are disposed at the exit of the sort path 322.

The upper bundle delivery roller 318b is adapted to form a pair of rollers with the lower bundle delivery roller 318a when the rockable guide 315 is tilted and moved to a closed position, and cooperate with the lower bundle delivery roller 318a to bundle-transport the sheets on the treating tray 313.

The construction of the inspection device 500 will now be schematically described with reference to FIG. 1.

Figure 1:
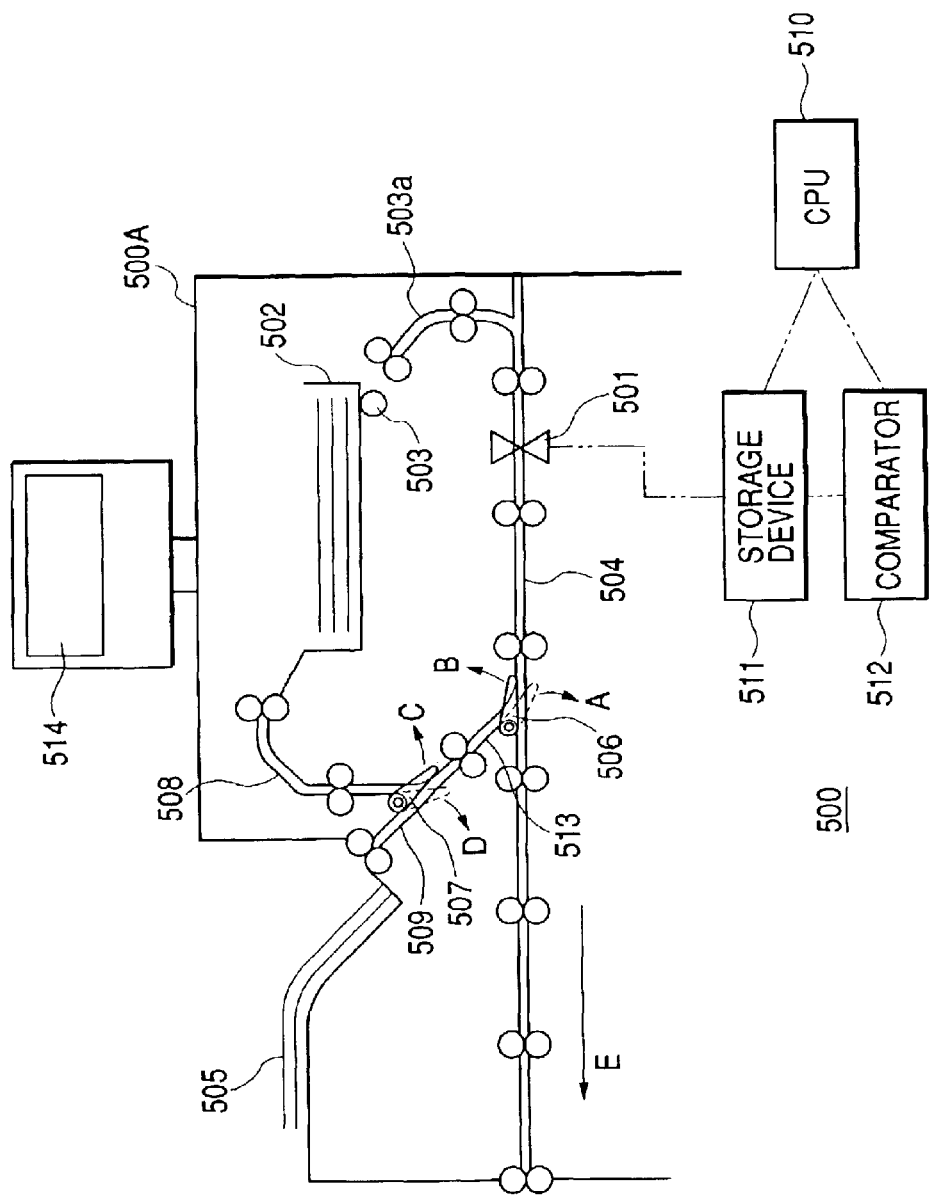
FIG. 1 schematically shows the construction of an inspection device provided in a copying machine which is an example of an image forming apparatus according to a first embodiment of the present invention.

In FIG. 1, the reference numeral 504 designates a transport path which is a sheet path for receiving the sheet outputted from the copying machine main body 100A, and this transport path 504 is connected to an exit for delivering the sheet to the sheet treating apparatus.

The reference numeral 501 denotes a reader which is reading means for reading the sheet information such as the image, color, configuration, etc. of the sheet, and this reader 501 is provided with a CCD, a CIS, etc., not shown, and the CCD and CIS are disposed above and below the transport path 504. The reading width of the reader is set to a width equal to or greater than a maximum supply sheet width so that even the configuration of the sheet can be read.

The reference numeral 513 designates a branching-off path which is an abnormal sheet path branching off from the transport path 504, and as will be described later, a sheet judged to be abnormal by the reading by the reader 501 is adapted to pass this branching-off path 513 and be transported to an inspection tray 505 which is an abnormal sheet containing portion exposed to the outside of an inspection device main body 500A, and a normal sheet is also adapted to be temporarily transported to a buffer tray 502 which is a normal sheet containing portion.

The reference numeral 506 denotes a first flapper which is first changeover means for changing over the sheet transport direction and guiding the sheet passing through the transport path 504 to the branching-off 513, and the reference numeral 507 designates a second flapper which is second changeover means for changing over the sheet transport direction to cause the sheet passing through the branching-off path 513 to travel toward the buffer tray 502 via a transport path 508 which is a normal sheet path branching off from the branching-off path 513.

The first flapper 506 is disposed at a location distant by at least a maximum supply sheet length from the reader 501, whereby any abnormal sheet can be reliably guided to the branching-off path 513 by the changeover of the first flapper 506.

The reference numeral 503 denotes re-feeding means provided in the buffer tray 502, and the reference character 503a designates a re-feeding path, and the sheet guided to the buffer tray 502 by the transport path 508 is adapted to pass again through the reader 501 via the re-feeding path 503a by the re-feeding means 503.

The reference numeral 511 denotes a storage device comprised of a hard disc or the like for storing therein the image data of an output sheet read by the reader 511, the reference numeral 512 designates a comparator for comparing the read image with reference data, and constituting abnormality detecting means with the reader 501, and the reference numeral 514 denotes an operating portion utilized for effecting the operation command of the inspection device 500 or the display or the like of abnormality history. The reference numeral 510 designates a CPU which is a control portion for governing the sequence control of the entire inspection device, the control of data handling and the control of the copying machine main body 100A and the sheet treating apparatus 300.

Figure 5:
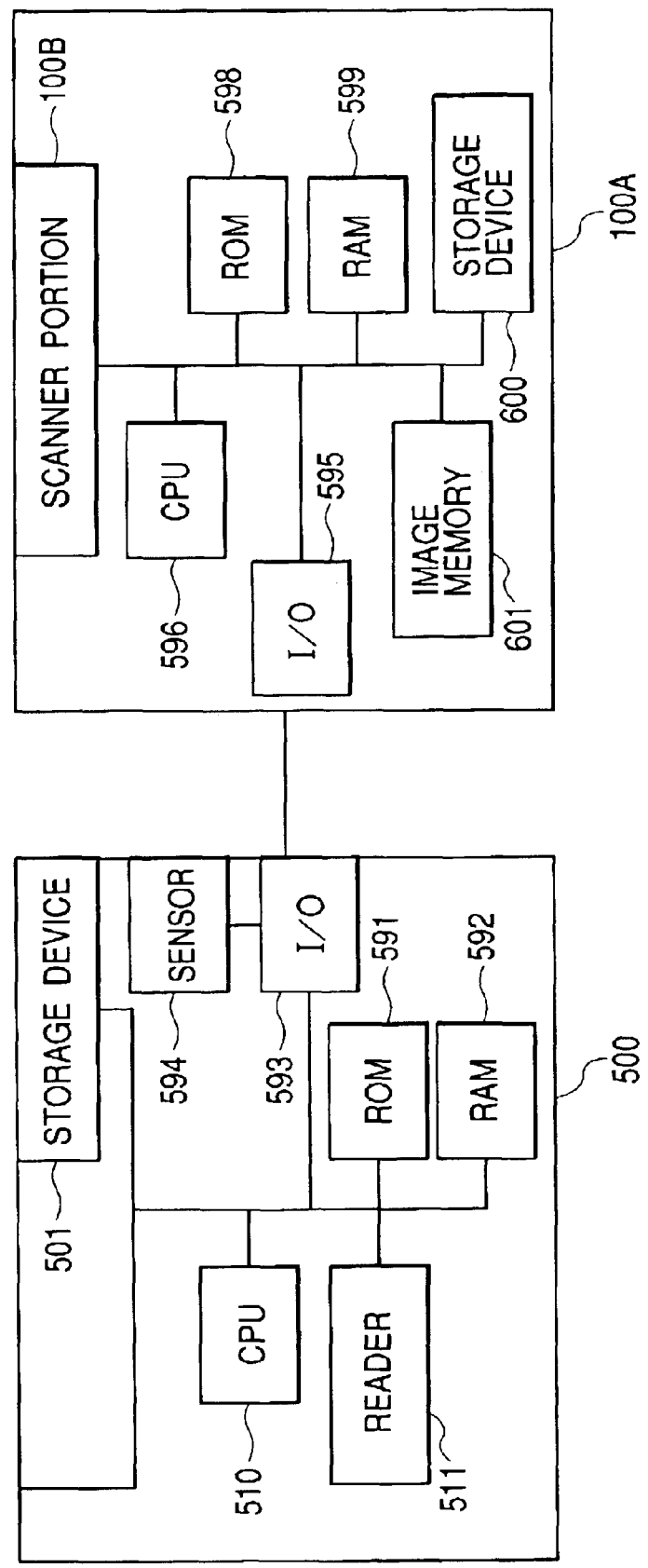
FIG. 5 is a control block diagram between the inspection device and the copying machine main body.

FIG. 5 is a control block diagram between the inspection device 500 and the copying machine main body 100A, and as shown in FIG. 5, on the inspection device 500 side, besides the CPU 510 and the reader 501, there are provided a ROM 591 storing therein a program for operating the CPU 510, a RAM 592 for supplying a working area necessary for the CPU 510 to be operated, an I/O 593 for effecting serial communication with the copying machine main body 100A, and monitoring a sensor or the like for detecting the presence or absence of the sheet, and a sensor 594 for detecting the sheet from the copying machine main body 100A.

On the other hand, on the copying machine main body side, besides the scanner portion 100B for reading an original to be copied and converting the read image into electronic data, there are provided an I/O 595 for effecting serial communication with the inspection device 500, a CPU 596 for effecting the sequence control and data handling of the entire copying machine, a ROM 598 for storing therein a program for operating the CPU 596, a RAM 599 for providing a working area necessary for the CPU 596 to be operated, a storage device 600 comprised of a hard disc or the like for storing therein the image data of the original read by the scanner portion 100B, and an image memory 601 for image-evolving the image data of the original read and converted into electronic data by the scanner portion 100B in order to form an image on the sheet.

Figure 6A:
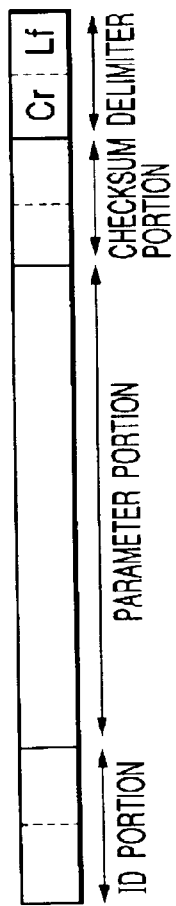
FIGS. 6A, 6B and 6C show examples of commands for effecting serial communication between the inspection device and the copying machine main body.
Figure 6B:
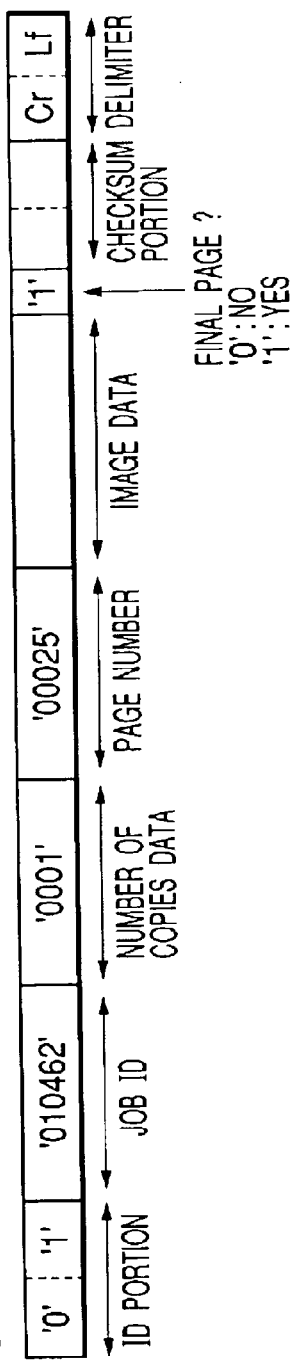
Figure 6C:
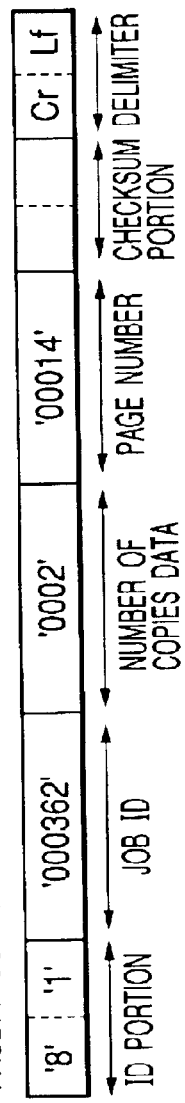

FIGS. 6A, 6B and 6C show examples of a command for effecting serial communication between the inspection device 500 and the copying machine main body 100A, and FIG. 6A shows the basic format of the command. Here, each data of the command is comprised of an ASCII code, and the first two bytes are an ID portion, and this ID portion represents the kind and communication direction of the command. A command in which ID is 00-7F is transmitted from the copying machine main body 100A to the inspection device 500, and a command in which ID is 80-FF is transmitted from the inspection device 500 to the copying machine main body 100A.

Also, a parameter portion next to the ID portion is an area-for converting, if it is necessary to further add information about each command, the information into ASCII data, and storing it therein. A checksum portion is information added to detect a communication error and obtained by converting a value added from the top of the command at one byte unit, and the same calculation is also effected on a side having received the command, and if the result is the same as the received checksum value, it can be judged that no communication error has occurred. The next Cr and Lf are delimiters and data representing the terminal of the command.

FIG. 6B shows a sheet delivery command for representing the information of a delivered output sheet, and this command is transmitted from the copying machine main body 100A to the inspection device 500 in synchronism with the output sheet. The ID of this sheet delivery command is 01. Also, in the parameter portion, there are stored a job ID to which a predetermined value is allotted for each copy job to distinguish between respective copy jobs, number of copies data representing the number of copies in the copy job, page number representing a page in the number of copies and the image data of the output sheet (including such information as the feature data, color and position of the tab of the output sheet), and data indicative of whether the page is the final page.

FIG. 6C shows a faulty output sheet detection command, which is transmitted to the copying machine main body 100A when the inspection device 500 has detected a faulty sheet. The copying machine main body 100A, when it receives this command, performs a recovery operation which will be described later and also informs a user to that effect.

Now, the inspection device 500 is adapted to calculate the degree of similarity between the image data from the reader 501 and the image data stored in the storage device 511, and judge the quality (abnormality) of the output sheet by this degree of similarity.

Description will now be made of an example of the method of calculating this degree of similarity.

Figure 7B:
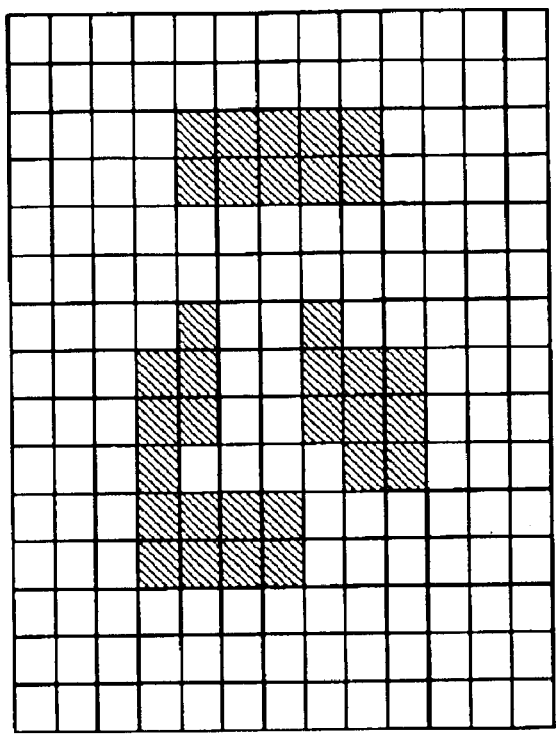
FIG. 7B represents the pattern of image data stored in the storage device of the inspection device.
Figure 7A:
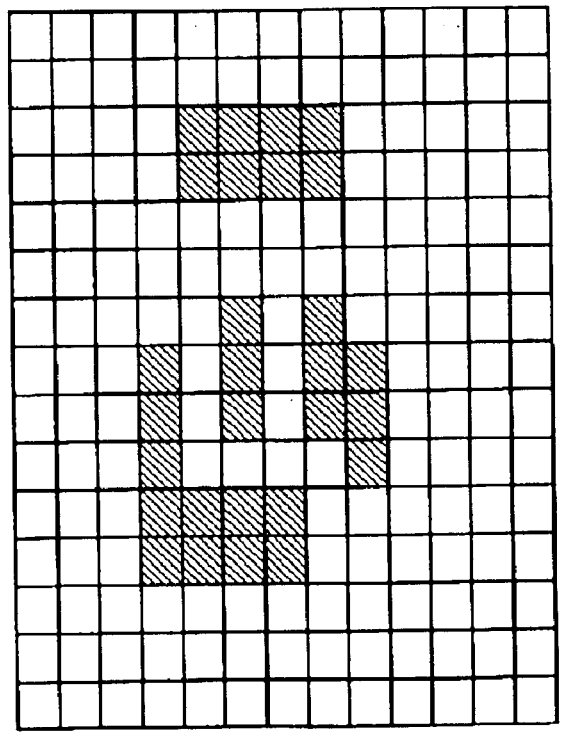
FIG. 7A represents the pattern of image data read by the reader of the inspection device.

FIG. 7A represents the pattern of the image data read by the reader 501 of the inspection device 500, and FIG. 7B represents the pattern of the image data stored in the storage device 511. The respective patterns are expressed as $B(i, j)$ and $P(i, j)$. $B(i, j)$ and $P(i, j)$ assumes a value of "1" in the case of a black pixel, and a value of "0" in the case of a white pixel. Assuming that the centroidal coordinates of $B(i, j)$ and $P(i, j)$ are (ibc, jbc) and (ipc, jpc), the degree of similarity COR between the two are represented by the following expression:

$$COR = \sum_i \sum_j P(i - ipc, j - jpc) \, xor \, B(i - ibc, j - jbc)$$

The sign "xor" represents an exclusive logical sum.

The above expression is indicative of the Hamming distance when the centroids of the pattern $B(i, j)$ and the pattern $P(i, j)$ are uniformized. Also, the greater is the value of COR, the greater is the degree of similarity between the two. When the degree of similarity COR is calculated by the foregoing calculation, comparison between a preset threshold value Th and COR is effected.

That is, when COR>Th, the read image data is substantially the same as the image data in the storage device, and the sheet is judged to be good. Also, when COR<Th, the degree of similarity between the two data is low, and the sheet is judged to be an abnormal article (abnormal sheet). By changing the value of the threshold value Th, it is possible to change the accuracy of judgment. Also, by changing the value of the threshold value Th in conformity with the kind of the image data to be inspected, it is possible to provide a more flexible inspecting function.

When from the degree of similarity thus calculated, the sheet is judged to be an abnormal article (abnormal sheet), the inspection device 500 eliminates the sheet judged to be an abnormal sheet and also, transmits to the CPU 596 of the copying machine main body 100A a command for commanding so as to form on a substitute sheet the image formed on the abnormal sheet.

Figure 8:
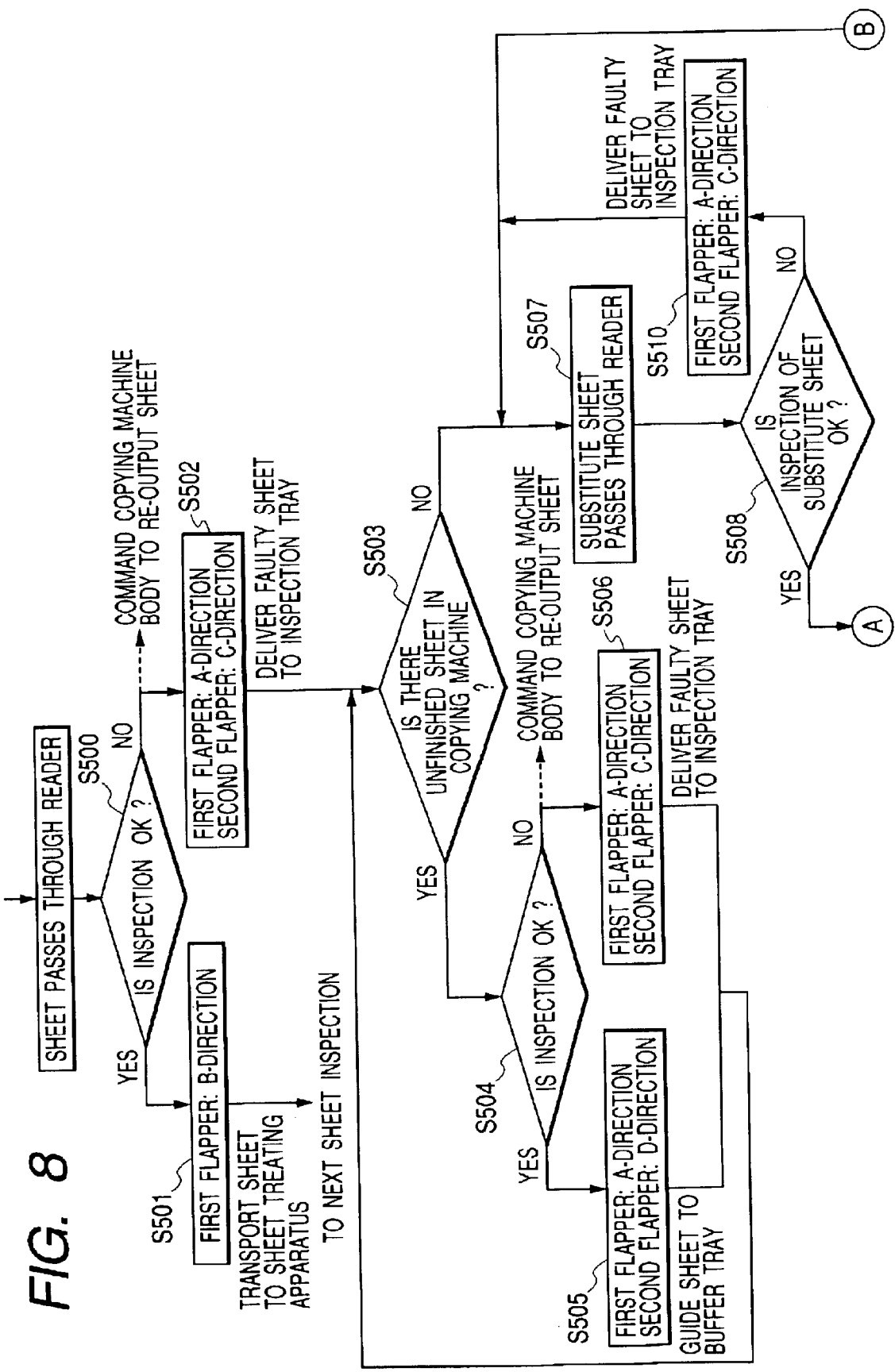
FIG. 8 shows a part of a flow chart showing the inspection controlling operation of the inspection device and the commanding operation thereof to the copying machine main body.
Figure 9:
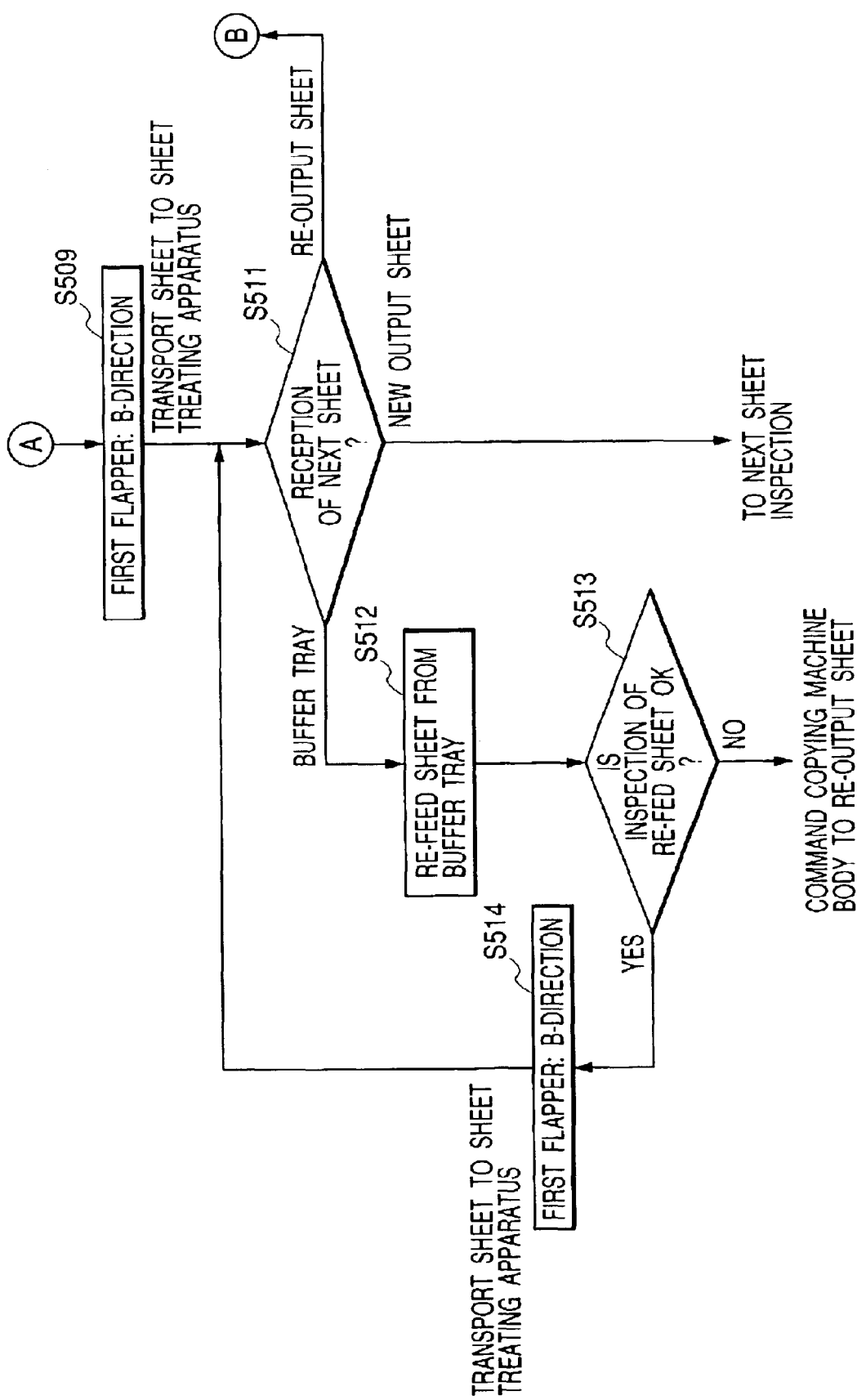
FIG. 9 shows the other part of the flow chart showing the inspection controlling operation of the inspection device and the commanding operation thereof to the copying machine main body.

The inspection controlling operation of the CPU 510 of the inspection device 500 of such a construction and the commanding operation thereof to the copying machine main body 100A will now be described with reference to FIG. 1 and flow charts shown in FIGS. 8 and 9.

The CPU 510 reads sheet information, e.g. image information and the shape of the sheet when the sheet outputted from the copying machine main body 100A passes through the transport path 504. This read information is compared with original data preserved in advance in the storage device 511 by the comparator 512, and if the result of the comparison is O.K., that is, if the inspection is O.K. (Y at S500), the first flapper 506 is moved in the direction of arrow B (S501). Thereby, the sheet intactly passes through the transport path 504, is transported in the direction of arrow E and is fed to the sheet treating apparatus 300. At this time, the display of the inspection being O.K. is done in the operating portion 514 to thereby inform the user that the output is favorable. These operations are successively repeated.

On the other hand, if as the result of the comparison by the comparator 512, the inspection is judged to be abnormal (N at S500), the first flapper 506 is changed over to A-direction and the second flapper 507 is changed over to C-direction (S502), and the sheet judged to be abnormal (hereinafter referred to as the abnormal sheet) is guided toward the transport path 509 via the branching-off path 513. As the result, the abnormal sheet is delivered to the inspection tray 505. This inspection tray 505 is exposed to the outside of the inspection device, whereby the user can visually perceive the delivered sheet, and can easily understand what kind of abnormality the abnormality of the sheet is.

Now, there is a case where at this time, in the copying machine main body, there are present several sheets such as the sheet already passed through the fixing device 118, a sheet on which an image is being formed, and sheets fed from the cassettes 1a and 1b.

So, when the abnormal sheet occurs, the CPU 510 judges by the communication with the CPU 596 of the copying machine main body 100A whether a sheet on which an image is being formed (hereinafter referred to as the unfinished sheet) is present in the copying machine main body, and if it judges that the unfinished sheet is present (S503), the CPU 510 sends to the CPU 596 of the copying machine main body 100A a command for effecting image forming to fixing on this unfinished sheet, and once discontinuing the subsequent operations.

Further, the sheet after the unfinished sheet is fed as a substitute sheet for the abnormal sheet, and the CPU 510 commands the copying machine main body to form on this substitute sheet the image being formed on the abnormal sheet, and controls the image forming portion 100C through the CPU 596 of the copying machine main body 100A.

Thereby, the unfinished sheet is thereafter guided to the inspection device 500 with the image fixed thereon, and sheet information is read by the reader 501. If as the result of the comparison by the comparator 512, the inspection is O.K. (Y at S504), the CPU 510 moves the first flapper 506 in the direction of arrow A and moves the second flapper 507 in the direction of arrow D (S505). As the result, the unfinished sheet is guided to the buffer tray 502 and is stacked thereon.

If as the result of the comparison, the inspection is judged to be abnormal (N at S504), the CPU 510 changes over the first flapper 506 to A-direction and the second flapper 507 to C-direction (S506), and delivers the abnormal sheet to the inspection tray 505.

On the other hand, after the unfinished sheet has been thus stacked on the buffer tray 502 (or the inspection tray 505), in other words, after the unfinished sheets in the copying machine main body have become null (N at S503), the substitute sheet on which an image has been formed is transported to the inspection device 500, and passes through the reader 501 (S507). Then, information is read by this reader 501 and if the inspection is O.K. (Y at S508), the CPU 510 changes over the first flapper 506 to B-direction as shown in the flow chart of FIG. 9 (S509).

Thereby, the substitute sheet is transported in E-direction and is guided to the sheet treating apparatus 300. If as the result of the comparison, the substitute sheet is judged to be abnormal (N at S508), the CPU 510 changes over the first flapper 506 to A-direction and the second flapper 507 to C-direction (S510), and delivers the abnormal sheet to the inspection tray 505, and also commands the CPU 596 of the copying machine main body 100A to output a sheet again.

After the substitute sheet has been thus guided to the sheet treating apparatus 300, the CPU 510 judges a sheet which is to be received next time, i.e., a sheet which is to be inspected (S511). Here, if the unfinished sheets are stacked on the buffer tray 502, the unfinished sheets are successively re-fed from the buffer tray 502 by the re-feeding means 503 (S512), pass through the transport path 504 and are guided to the sheet treating apparatus 300.

At this time, sheet information is read again by the reader 501, and now whether an abnormality such as double feeding or bending has occurred to the sheet or not is checked up, and if the inspection of this re-fed sheet is O.K. (Y at S513), the CPU 510 changes over the first flapper 506 to B-direction (S514), and guides the re-fed sheet to the sheet treating apparatus 300 and also commands the CPU 596 of the image forming apparatus main body 100A to perform the remaining jobs.

If as the result of the comparison, the re-fed sheet is judged to be abnormal (N at S513), the CPU 510 changes over the first flapper 506 to A-direction and the second flapper 507 to C-direction to thereby deliver the abnormal sheet to the inspection tray 505 and also commands the CPU 596 of the copying machine main body 100A to output a sheet again. The sheet outputted again in accordance with this command (substitute sheet) thereafter passes through the reader 501 as already described, and thereafter is inspected (S507, S508).

As described above, design is made such that the abnormal sheet is delivered to the inspection tray 505 and a good sheet is not abolished but is contained in the buffer tray 502 and the image formed on the abnormal sheet is formed on the substitute sheet, which is outputted again, whereafter the sheet contained in the buffer tray 502 is re-fed, whereby even when an abnormal sheet occurs, the recovery of the abnormal sheet automatically eliminated without the copying machine main body 100A can be effected. Thus, the user need not always stay before the copying machine and productivity is improved.

Further, with such a construction, there is no sheet abolished except the abnormal sheet and therefore the waste of sheets is avoided and the abnormal sheet is not transported to the sheet treating apparatus 300 and therefore, the bound sheets can be ensured to be good.

A specific example of a case where the inspection becomes N.G. will now be described with reference to FIGS. 10A, 10B, 12A and 12B.

Figure 10A:
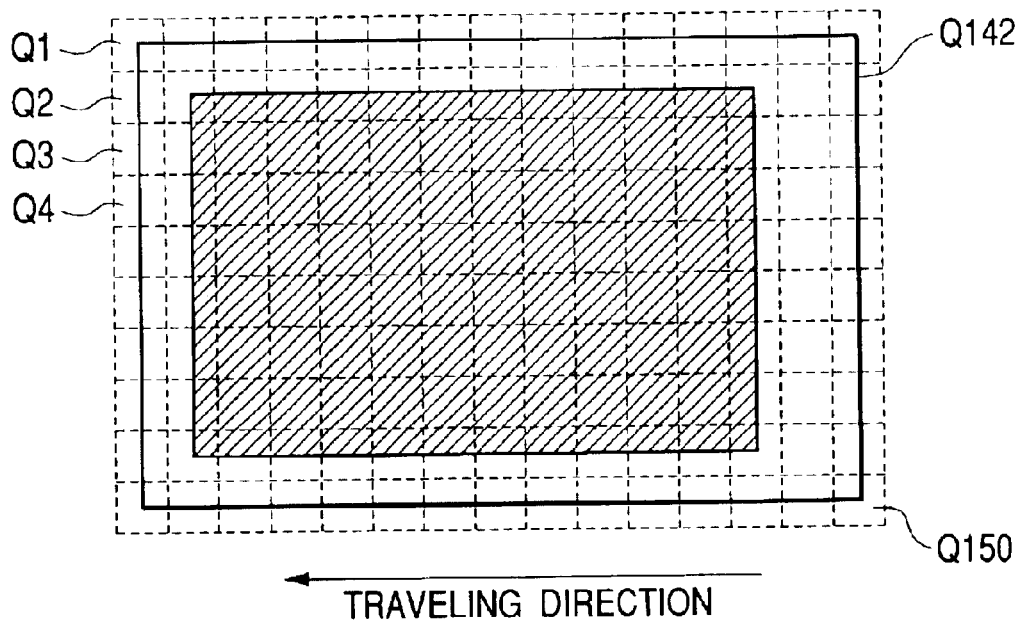
FIGS. 10A and 10B show specific examples of a case where the inspection by the inspection device becomes N.G.
Figure 10B:
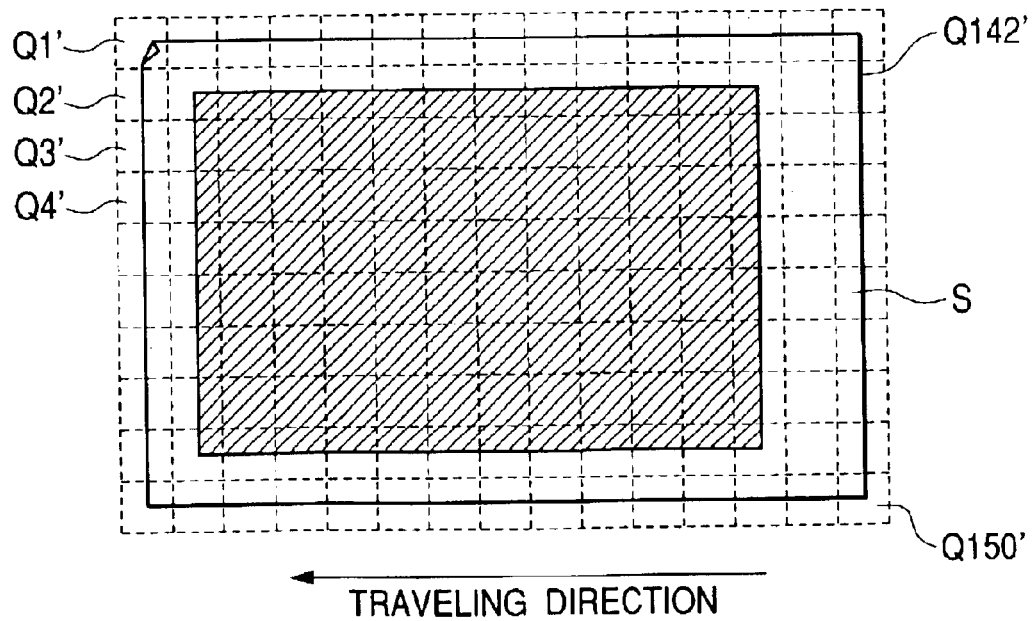

FIG. 10A shows an example of sheet information which is an origin of comparison stored in the storage device 511, and it includes the configuration information of the sheet, the position of the image, etc. FIG. 10B shows sheet information read by the reader 501. In the comparator 512, these bits of information are divided into a check pattern, e.g. 150 elements, as shown in FIGS. 10A and 10B, and elements Q1–Q150 and element Q1'–Q150' are compared with each other with respect to respective corresponding elements.

In the example shown in FIG. 10B, the leading edge of a sheet S is bent, and in this case, the comparator 512 recognizes the different between the elements Q1 and Q1'. On the basis of the difference between the elements Q1 and Q1' which is data regarding the configurational portion of this sheet S, the CPU 510 recognizes that the sheet has contacted with an obstacle in the transport path and has caused a curled selvage.

When it thus recognizes that a curled selvage has occurred to the sheet S, the CPU 510 sends a signal for changing over the first flapper 506 and delivers this sheet S to the inspection tray 505 and commands the CPU 596 of the copying machine main body 100A to output a substitute sheet on which the same image as that on the abnormal sheet has been formed. Also, as shown in FIG. 11A, what abnormality is presumed to have occurred to which sheet in what job is displayed on the operating portion 514. Thereafter the operations shown in the description of the operation of the inspection device 500 are performed.

Figure 12A:
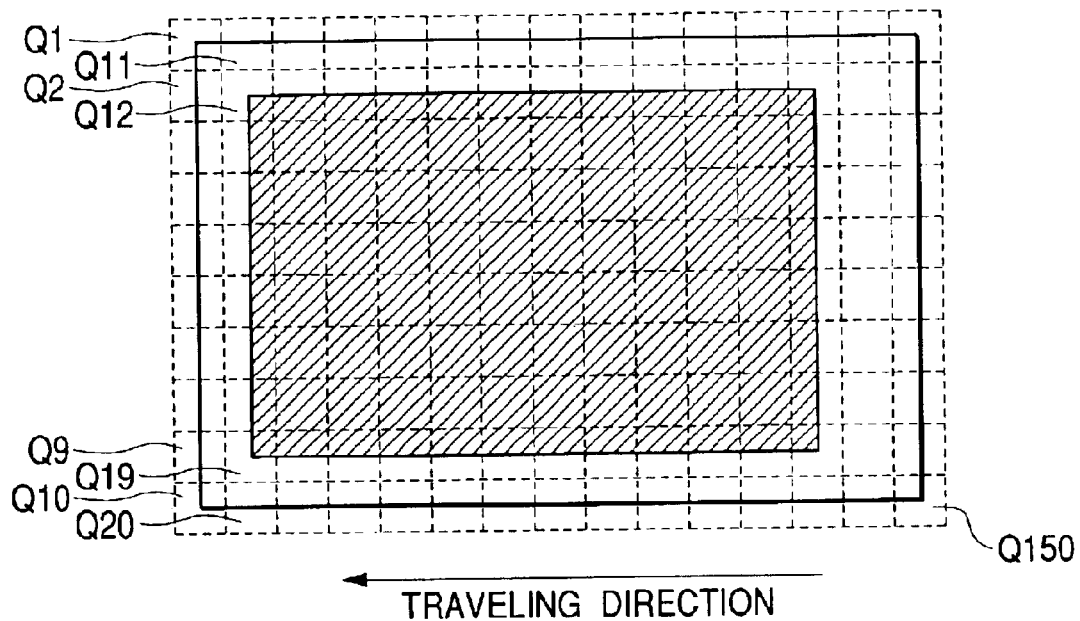
FIGS. 12A and 12B show other specific examples of a case where the inspection by the inspection device becomes N.G.
Figure 12B:
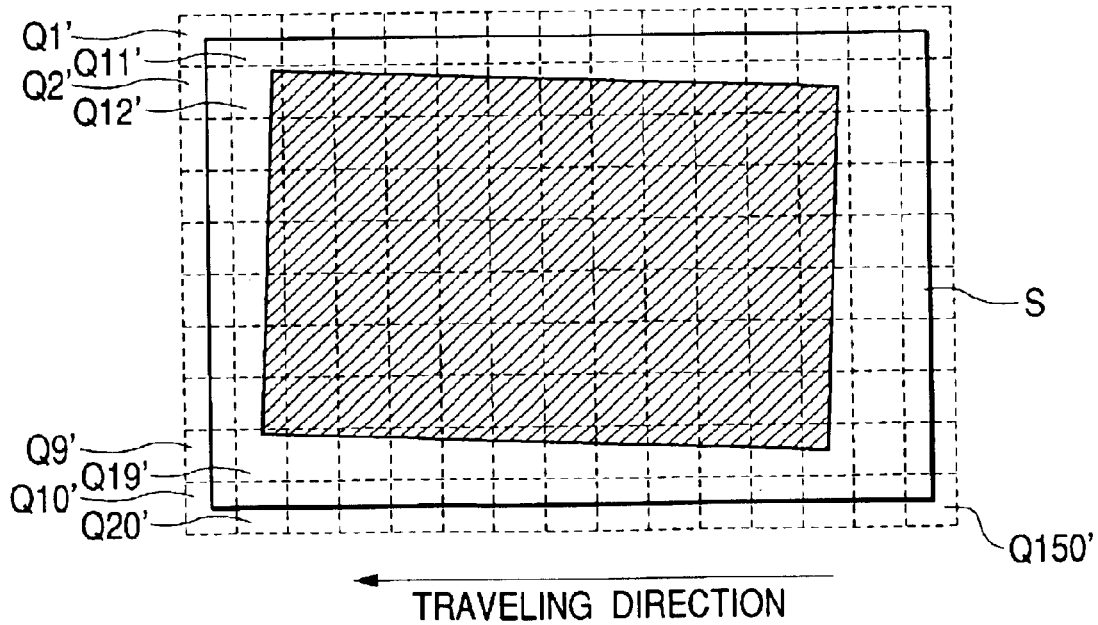

On the other hand, FIG. 12A shows the sheet information which is the origin of comparison, and FIG. 12B shows information read by the reader 501. In this example, the sheet S has been skew-fed when it arrives the image forming portion and therefore, the image has become oblique relative to the sheet S. Therefore, the comparator 512 recognizes a difference in the portions of the elements Q12–Q19 and the elements Q12'–Q19'.

In this case, the CPU 510 sends a signal for changing over the first flapper 506 and delivers this sheet S to the inspection tray 505, and also commands the CPU 596 of the copying machine main body 100A to output this substitute sheet again. Also, a shown in FIG. 11B, what abnormality is presumed to have occurred to which sheet in what job is displayed on the operating portion 514. Thereafter, the operations shown in the description of the operation of the inspection device 500 are performed.

Also, the history of the N.G. can be confirmed later as shown in FIG. 11C. Thereby, the user, even if he does not stay by the copying machine main body 100A at all times, can know when and what N.G. has occurred, after all jobs have been finished. The user can also confirm the sheet delivered to the inspection tray 505 while referring to the history data later.

While mention has hitherto been made of examples in which the bending and skew-feed of the sheet are recognized, it is of course possible to recognize and compare various kinds of information about the sheet such as the density and color misregister of the image, stains, the positions of punch holes and the position of a tab. Also, while the image information has been divided into 150 elements and each element has been compared, this number of elements is not restrictive. Also, of course, the comparison elements may be compared in each line, or may be evolved into bit map data and compared with respect to each point.

Now, depending on the state of abnormality, there is a case where however many times a sheet is outputted by the copying machine main body 100A, the inspection does not become O.K. For example, when colored paper is to be outputted, if sheets of a wrong color are set in the cassettes 1*a* and 1*b* of the copying machine main body 100A, the portion of the elements Q142–Q150 of already described FIG. 10A is a non-image area and therefore, the color recognized there is the color of the sheets. However, since sheets of a wrong color are set, however many times the sheet is outputted, the comparator 512 recognizes a difference in the portions of the elements Q142–Q150 and the elements Q142'–Q150'.

So, in the present embodiment, as shown, for example, in FIG. 13, design is made such that setting is done so that the operation may be stopped by the operating portion 514 if N.G. continues 5 times on end, whereby the number of times of the automatic recovery operation can be limited.

Thereby, the inspection device 500 commands the CPU 596 of the copying machine main body 100A to output the sheet again and counts the number of times of N.G. until the inspection becomes O.K. in accordance with the above-described flow charts. When this number of times of N.G. reaches 5 times, the inspection device 500 outputs a stop command to the CPU 596 of the copying machine main body 100A and on the other hand, displays on the operating portion 514 that the job has been stopped due to a succession of N.G., and also informs the user so as to check up the copying machine main body 100A.

This automatic recovery operation is not restricted to being limited in conformity with the number of times of the continuous occurrence of N.G., but may be set so as not to be performed when the cumulus of a particular N.G. factor, e.g. the N.G. of low density, is counted and this count value has reaches 10 times.

Figure 14:
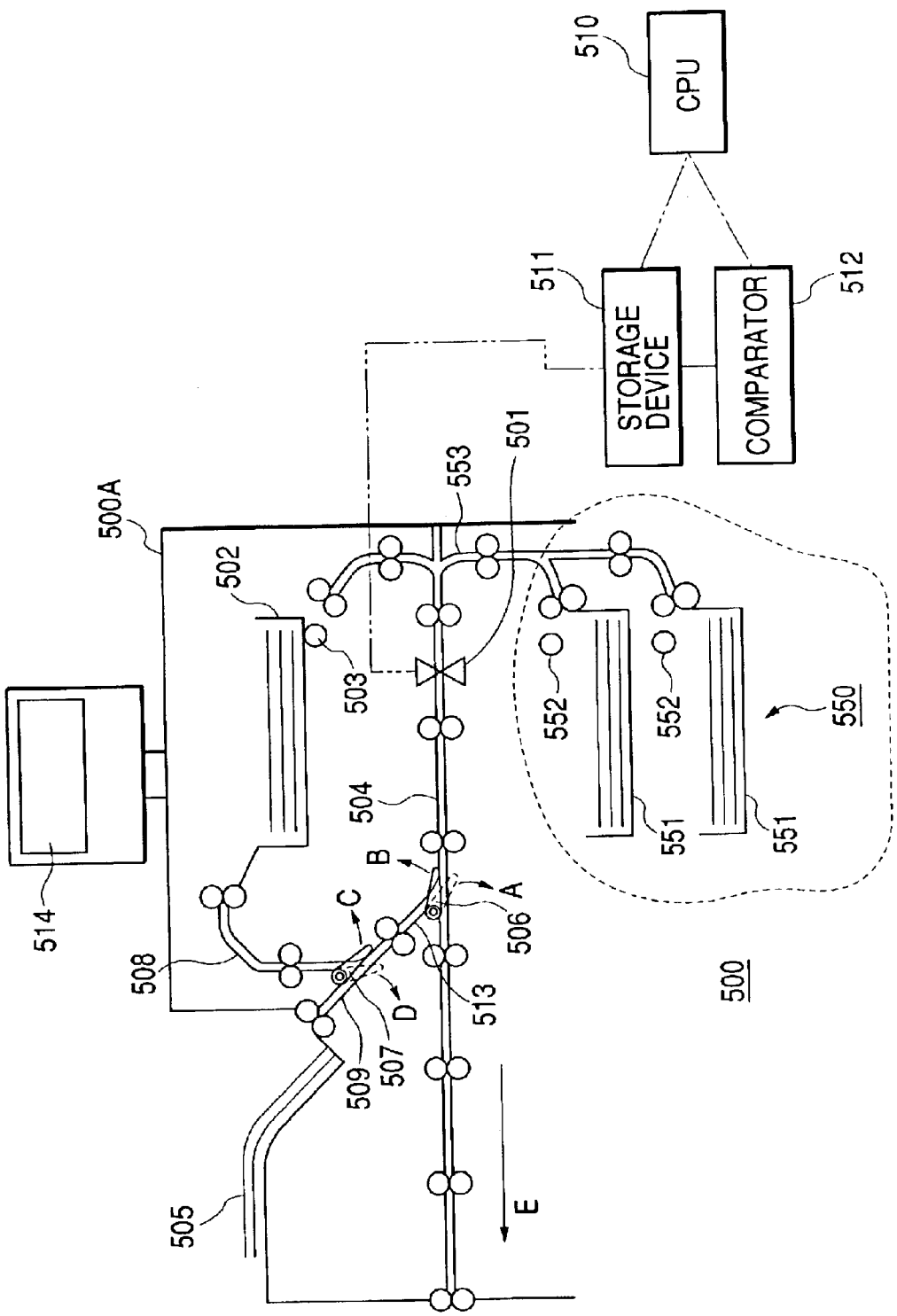
FIG. 14 schematically shows the construction of the inspection device having an inserter mounted thereon.

Now, when in the top cover mode or the slip sheet mode, there is a case where a top cover and slip sheet which are sheets not passed through the image forming portion 100C are contained in an inserter in advance. When it is necessary to inspect the top cover and the slip sheet contained in this inserter, the inserter 550 is moved on the copying machine main body 100A or the inspection device 500 as shown in FIG. 14.

This inserter 550 has a tray 551 for stacking the sheets thereon, and sheet feeding means 552, and is disposed so that the sheet fed from the inserter 550 (tray 551) by the sheet feeding means 552 may pass through an insertion path 553 and join the transport path 504 of the inspection device 500 upstream of the reader 501.

Also, in a case where the inserter 550 is mounted as described above, the information of the top cover and the slip sheet contained in the inserter 550 is stored in advance in the storage device 511. Thus, the sheet fed from the inserter 550 can also be inspected by the reader 501.

While in the description hitherto made, the sheet treating apparatus 300 is mounted downstream of the inspection device 500, this is not restrictive, but of course, mere stacking means such as a stacker may be mounted instead of the sheet treating apparatus 300. Also, while as the reader, mention has been made of one using a CCD or a CIS, of course there is not restrictive.

Further, if a sensor such as an ultrasonic sensor or a transmission type sensor for detecting the thickness of the sheet is provided near the reader, it will also be possible to detect as an abnormality a sheet closely sticking on other sheet and apparently difficult to judge as double feed, or to discriminate the difference between the kinds of transported sheets and perform the recovery operation as described above. Of course, instead of the reader, these may be disposed exclusively for the detection of double feed.

While in the present embodiment, the inspection device has been described as an independent device discrete from the copying machine main body 100A (image forming apparatus main body), it may of course be provided integrally with the image forming apparatus main body.

Description will now be made of a second embodiment of the present invention in which, as mentioned above, the inspection device is provided integrally with the image forming apparatus main body.

Figure 15:
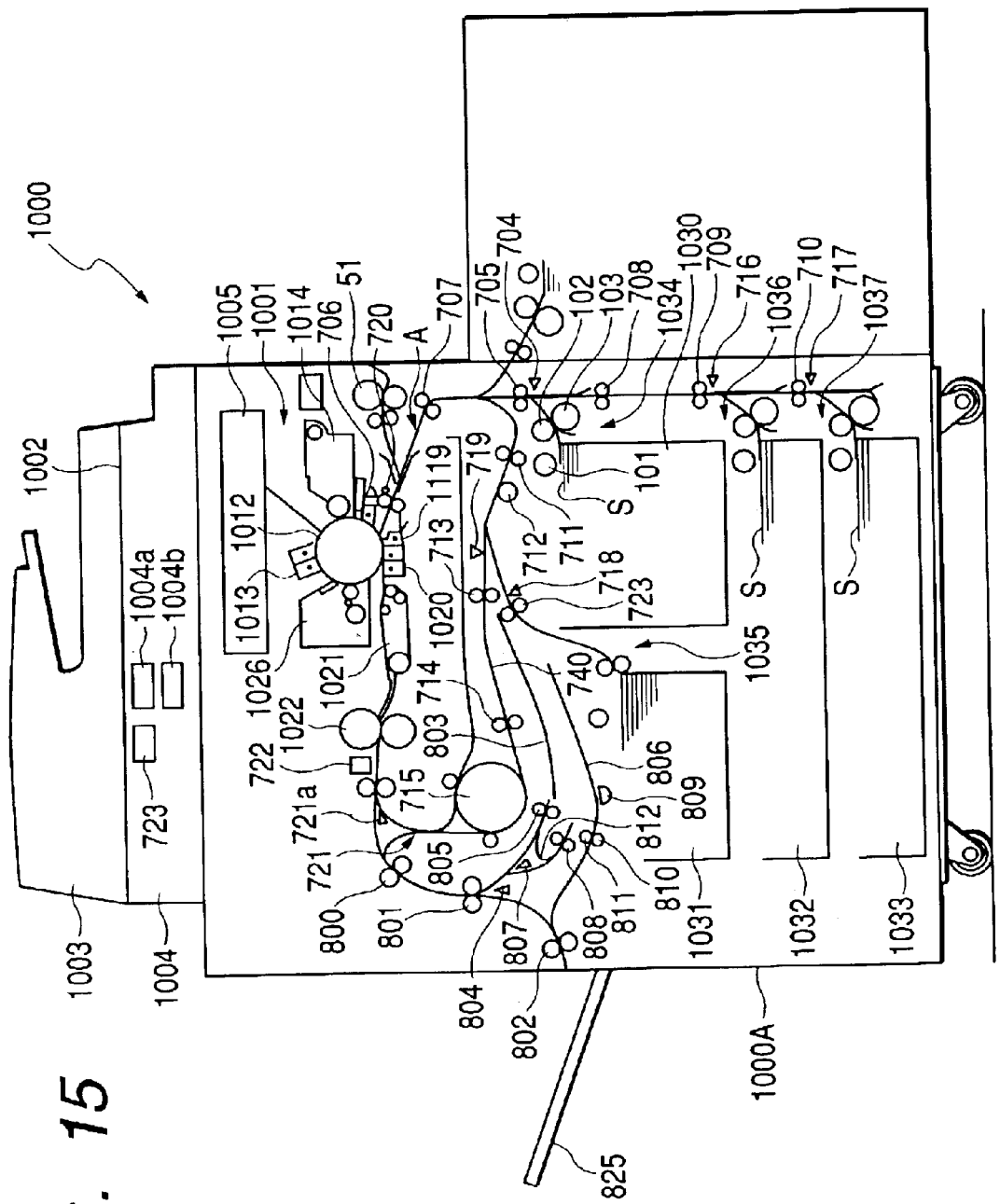
FIG. 15 schematically shows the construction of a copying machine which is an example of an image forming apparatus according to a second embodiment of the present invention.

Referring to FIG. 15 which schematically shows the construction of a copying machine which is an example of the image forming apparatus according to the present embodiment, the reference numeral 1000 designates the copying machine. This copying machine 1000 is provided with an original reading portion 1004 for reading the image of an original, an image forming portion 1001 for forming an image on a sheet on the basis of image information read by the original reading portion 1004, deck feeding portions 1034, 1035 and cassette feeding portions 1036, 1037 for feeding sheets S stacked on decks 1030, 1031 and sheet cassettes 1032, 1033 contained in a copying machine main body 1000A to the image forming portion 1001.

The reference numeral 1003 denotes an original feeding device, by which the original is transported to a predetermined position on an original stand 1002 comprising a transparent glass plate provided on the upper surface of the copying machine main body 1000A.

The image forming portion 1001 is provided with a photosensitive drum 1012, a charger 1013 for uniformly charging the surface of the photosensitive drum 1012, a developing device 1014 for developing an electrostatic latent image formed on the surface of the photosensitive drum 1012 charged by the charger 1013 to thereby form a toner image to be transferred to the sheets S, a transfer charger 1119 for transferring the toner image formed on the surface of the photosensitive drum 1012 to the sheet S, a separating charger 1020 for separating the sheet S having the toner image transferred thereto from the photosensitive drum 1012, and a cleaner 1026 for removing any toner residual on the photosensitive drum 1012 after the toner image has been transferred therefrom.

Also, downstream of the image forming portion 1001, there are provided a transporting portion 1021 for transporting the sheet S having the toner image transferred thereto, and a fixing device 1022 for fixing the toner image on the sheet S transported by the transporting portion 1021 as a permanent image.

In this copying machine 1000, transport rollers 705, 707–712, 723 and sheet pass sensors 704, 716–718 for detecting the leading edge and trailing edge of the sheet are disposed on a transport path for transporting the sheets from the deck feeding portions 1034, 1035 and the cassette feeding portions 1036, 1037 to the image forming portion 1001.

Design is made such that the sheet fed from each of the sheet feeding portions 1030–1033 is fed by transport rollers (ante-registration roller) 707, and thereafter is fed to a transferring portion comprised of the photosensitive drum 1012 and the transfer charger 1119 at predetermined timing by registration rollers 706. Near the upstream side of the registration rollers 706, there is disposed a registration sensor 720 for detecting the arrival of the leading edge of the sheet at the registration rollers 706.

The reference character 1004*b* designates a main body controlling portion which is a controlling portion, and this main body controlling portion 1004*b* is adapted to output an image evolving signal to an image evolving portion 1004a when the leading edge of the sheet S has arrived at an image evolving position A, and design is made such that on the basis of this signal, the image evolving portion 1004a evolves an image, and on the basis thereof, a writing laser portion 1005 emits a laser beam through the main body controlling portion 1004b.

Now, a first sheet reverse path 740 branches off from the transport path between a transport roller 712 and transport rollers 723, and on this first sheet reverse path 740, there are disposed, in succession from the downstream side, a sheet pass sensor 719, a two-side right roller 713, a two-side left roller 714, a reverse roller 715 rotatable in forward and reverse directions, and a sheet reversing portion 721.

Figure 16:
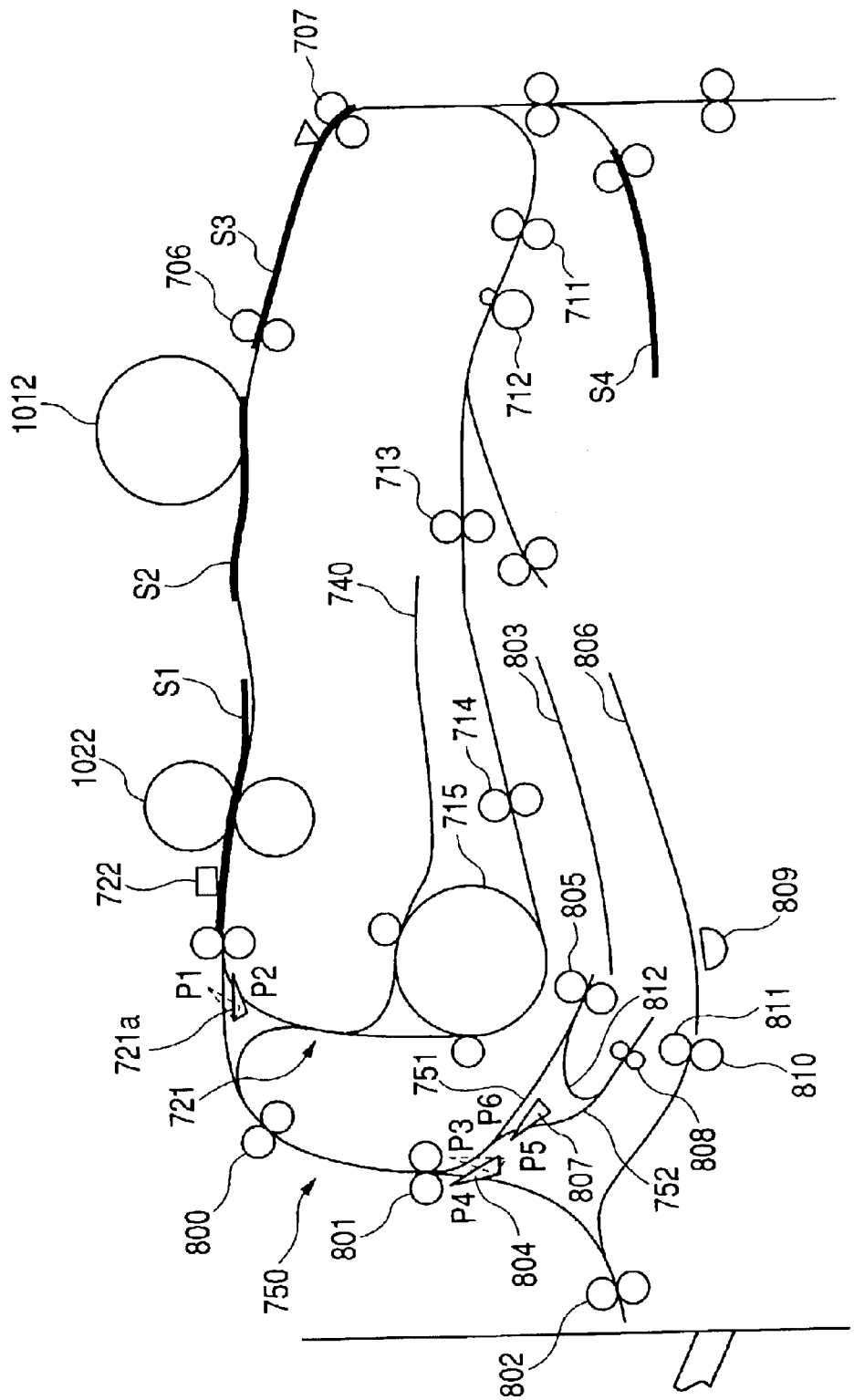
FIG. 16 shows a sheet transport route in the main body of the copying machine of FIG. 15.

The reference character 721a denotes a first flapper adapted to be moved to a position P1 for making the sheet travel toward the sheet reversing portion 721 indicated by broken line in FIG. 16, or a position P2 for not making the sheet S indicated by solid line travel toward the sheet reversing portion 721.

In the copying machine 1000 of such a construction, when the image of the original is to be copied, the image of the original on the original stand 1002 is first read by the original reading portion 1004, and the data thereof is once preserved in the image evolving portion 1004a. Next, on the basis of a signal from the main body controlling portion 1004b, the image evolving portion 1004a evolves an image, and along therewith, the writing laser portion 1005 emits a laser beam and scans it on the photosensitive drum 1012, whereby an electrostatic latent image is formed on the photosensitive drum 1012.

The thus formed electrostatic latent image is developed by the developing device 1014, and thereafter is transferred to the sheet S fed to the transferring portion at predetermined timing by the registration rollers 706. The sheet S to which the toner image has been transferred is transported to the fixing device 1022 by the transporting portion 1021, and by this fixing device 1022, the toner image is fixed as a permanent image.

In this copying machine 1000, image forming on both sides of the sheet S is possible, and when image forming on both sides is to be effected, the sheet S on which an image has been formed by the image forming portion is first sent to the sheet reversing portion 721, and the sheet is reversed by the reverse roller 715 and is sent into a first sheet reverse path 740, and is again fed to the image forming portion 1001 (transferring portion) via a re-feeding path comprising the two-side left roller 714, the two-side right roller 713, the transport roller 712, the transport rollers 711, the ante-registration rollers 707 and the registration rollers 706.

The above-mentioned rollers are rotatively driven by the driving force of a driving motor, not shown, being transmitted thereto. Also, each of these rollers is adapted to have its rotating operation controlled by the main body controlling portion 1004b on the basis of the result of the detection by the above-described sheet pass sensors.

Now, the reference numeral 722 denotes reading means (line CCD) for reading the sheet itself having left the fixing device 1022, and image information formed on the sheet S. The reference numeral 723 designates comparing means constituting abnormality detecting means with the reading means 722, and by this comparing means 723, data from the reading means 722 is compared with data for comparison, whereby the main body controlling portion 1004b judges the abnormality of the sheet itself such as the bending of the corner thereof, and such image abnormality as the toner failing to form an image accurately. In the present embodiment, an inspection device is constituted by the main body controlling portion 1004b, the reading means 722 and the comparing means 723, and is provided in the copying machine 1000.

The main body controlling portion 1004b detects the occurrence of an abnormal sheet from the result of the comparison from the comparing means 723, and when it detects the occurrence of the abnormal sheet, it controls the abnormal sheet so as to be delivered to a tray for abnormal sheets which will be described later, and controls, and controls a normal sheet being transported so as to be once delivered to a tray capable of re-feeding sheets.

Further, this main body controlling portion 1004b thereafter controls so as to use a predetermined sheet subsequent to this abnormal sheet as a substitute sheet for the abnormal sheet, and to form on this substitute sheet an image formed on the abnormal sheet, and deliver this substitute sheet, and thereafter deliver the normal sheet once delivered to the re-feeding tray.

FIG. 16 shows the sheet transport route in the copying machine main body 1000A, and in FIG. 16, the reference numeral 800 designates a first delivery roller, the reference numeral 801 denotes a second delivery roller, the reference numeral 802 designates a third delivery roller, and the reference numeral 750 denotes a sheet path in which these first to third delivery rollers 800 to 802 are disposed. The reference numeral 803 designates an abnormal sheet tray which is an abnormal sheet containing portion for containing therein abnormal sheets detected as being abnormal by the reading means 722, and the reference numeral 804 denotes a second flapper which is first changeover means provided at the branch-off point between the sheet path 750 and an abnormal sheet path 751 for transporting the abnormal sheets to the abnormal sheet tray 803, and making the abnormal sheets traveling toward the abnormal sheet tray 803, and this second flapper 804 is normally in a position P3 indicated by broken line.

The reference numeral 805 designates abnormal sheet delivery rollers rotatable in forward and reverse directions for delivering the sheet having passed the second flapper 804 to the abnormal sheet tray 803, the reference numeral 806 denotes a temporary stack tray which is a normal sheet containing portion for once stacking therein a normal sheet flowing upstream of the abnormal sheet and capable of re-feeding sheets from the lowermost sheet, and the reference numeral 807 designates a third flapper which is second changeover means provided at the branch-off point between the abnormal sheet path 751 and a normal sheet path 752 for transporting the normal sheet to the temporary stack tray 806, and making the normal sheet travel toward the temporary stack tray 806, and this third flapper 807 is normally in a position P5 indicated by solid line.

The reference numeral 808 denotes stack delivery rollers for delivery the normal sheet guided by the third flapper 807 to the temporary stack tray 806, the reference numeral 809 designates a D-cut roller for re-feeding the normal sheet contained in the temporary stack tray 806, the reference numeral 810 denotes a re-feeding roller, and the reference numeral 811 designates a separating roller. The reference numeral 812 denotes a second sheet reverse path, and when the abnormal sheet delivery rollers 805 are reversely rotated, a sheet is reversed along therewith, and this sheet passes through the second sheet reverse path 812 and is delivered to the temporary stack tray 806.

The controlling operation of the already described main body controlling portion 1004b will now be described in detail.

Description will first be made of the controlling operation when in case of a reverse delivery mode in which a sheet on one side (front surface) of which an image has been formed is reversed and delivered, for example, the image on the leading edge of the first one of three A4 size sheets on which images have been continuously formed is detected as being abnormal and the second sheet and the third sheet are normal.

In this case, the three sheets S1, S2 and S3 continuously travel toward the registration rollers 706, and the images of a first side and a second side are formed on the sheets S1 and S2, respectively. Next, the reading means 722 detects the abnormality of the image on the leading edge of the sheet S1 passed through the fixing device 1022, whereupon the main body controlling portion 1004b judges by a timer or a sensor, not shown, that the leading edge of the sheet S1 has not yet arrived at the first flapper 721a, and holds the first flapper 721a in a position P2 indicated by solid line so that the sheet may travel toward the first delivery rollers 800.

At this time, the subsequent sheet S3 has cleared an image evolving position A (see FIG. 15) and therefore, the image of the third surface is intactly formed on the sheet S3. Thereby, the sheets S1, S2 and S3 pass the first delivery rollers 800 and the second delivery rollers 801.

Next, the second flapper 804 is changed over to a position P4 indicated by solid line, and further when the sheet S1 passes it, the third flapper 807 is changed over to a position P5 indicated by solid line so that the sheet S1 may travel toward the abnormal sheet tray 803. Thereby, the sheet S is delivered to the abnormal sheet tray 803 via the abnormal sheet delivery rollers 805, as shown in FIG. 17.

Figure 18:
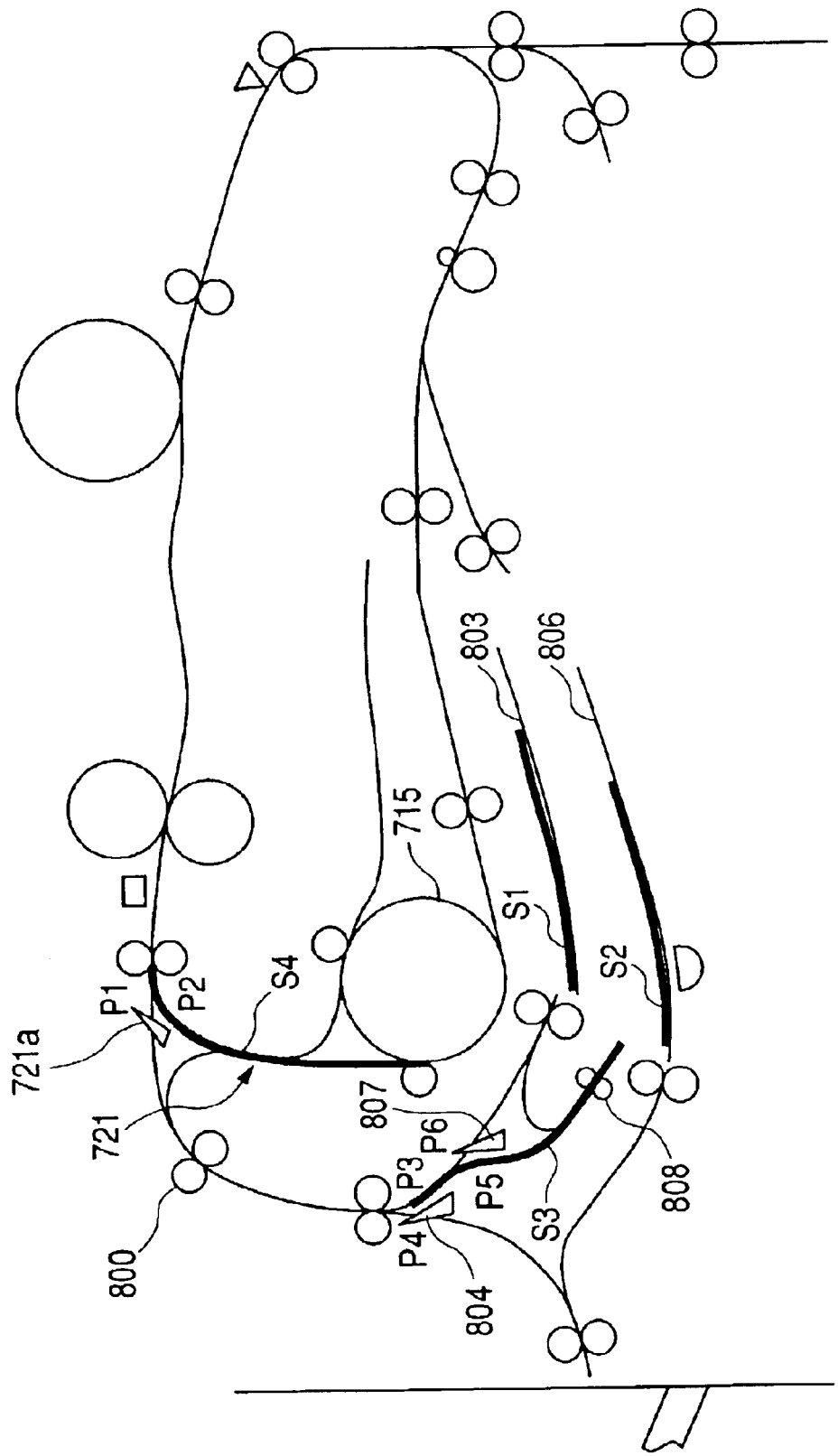
FIG. 18 is a second view illustrating the controlling operation in case of the surface reverse sheet delivery mode.

At this time, the third flapper 807 is changed over to a position 16 indicated in FIG. 18 before the sheets S2 and S3 arrive at the third flapper 807. Thereby, the sheets S2 and S3 are delivered to the temporary stack tray 806 via the stack delivery rollers 808.

Figure 17:
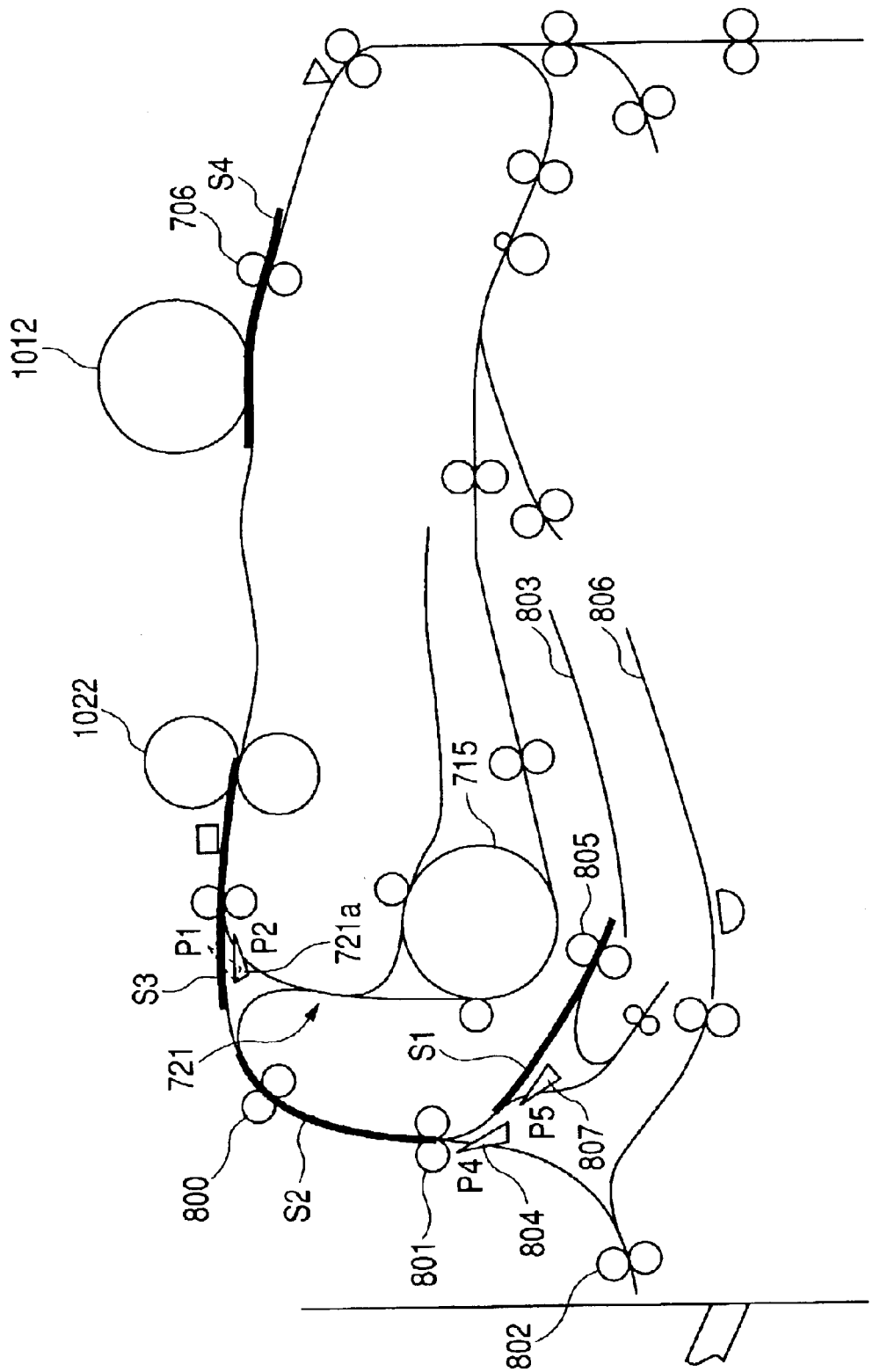
FIG. 17 is a first view illustrating the controlling operation of a main body controlling portion provided in the copying machine main body in case of a surface reverse sheet delivery mode.

On the other hand, when the abnormality of the image of the leading edge of the sheet S1 is detected, as shown in FIG. 16, the next transported sheet S4 is used as a substitute sheet, and when this sheet S4 passes through a transferring portion constituted by the photosensitive drum 1012 and the transfer charger 1119 (see FIG. 15) as shown in FIG. 17, the image of the first side having the same content as the sheet S1 is formed. Thereafter, the sheet S4 passes through the fixing device 1022 and is sent to the sheet reversing portion 721 by the first flapper 721a changed over to the position P1 as shown in FIG. 18.

Figure 19:
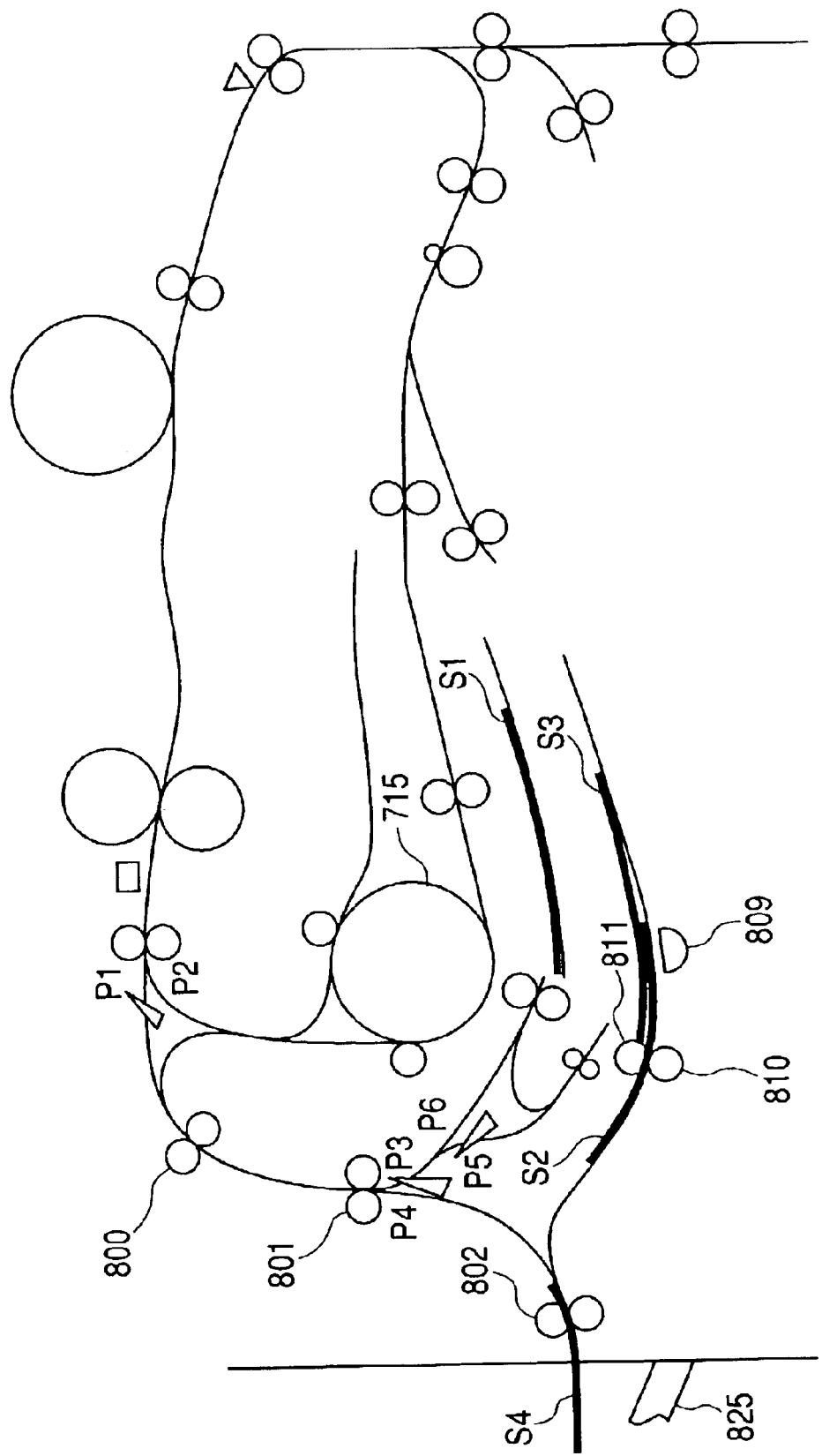
FIG. 19 is a third view illustrating the controlling operation in case of the surface reverse sheet delivery mode.

Next, the sheet S4 sent to this sheet reversing portion 721 is reversed by the reverse roller 715, and thereafter is delivered to a delivery tray 825 with the image surface thereof facing down, via the first delivery rollers 800, the second delivery rollers 801, the second flapper 804 changed over to a position P3 and the third delivery rollers 802, as shown in FIG. 19.

Also, after the sheet S4 has been thus delivered, the D-cut roller 809 is rotated, whereby the lowermost sheet S2 of the normal sheets S2 and S2 once stacked on the temporary stack tray 806 is transported to the re-feeding roller 810 and the separating roller 811.

At this time, the separating roller 811 imparts a force in a direction opposite to the transporting direction by a torque limiter, not shown, and therefore, even if the sheet S3 is likely to be sent with the sheet S2, the sheet S2 alone is sent. Subsequently, the sheet S3 is likewise sent and is delivered to the delivery tray 825 with the image surface thereof facing down via the third delivery rollers 802.

As described above, the abnormal sheet is delivered to the abnormal sheet tray 803 and good sheets are not abolished but are contained in the temporary stack tray 806, and the image formed on the abnormal sheet is formed on the substitute sheet, which is outputted again, whereafter the sheets contained in the temporary stack tray 806 are re-fed, whereby even if an abnormal sheet occurs, the order of images does not go wrong and recovery can be automatically done without the copying machine 1000 being stopped, and the downtime can be reduced.

Description will now be made of the controlling operation when in case of a reversal delivery mode, for example, an image on the trailing edge of the first one of three A4 size sheets on which images have been continuously formed is detected as being abnormal and the second sheet and the third sheet are normal.

Figure 20:
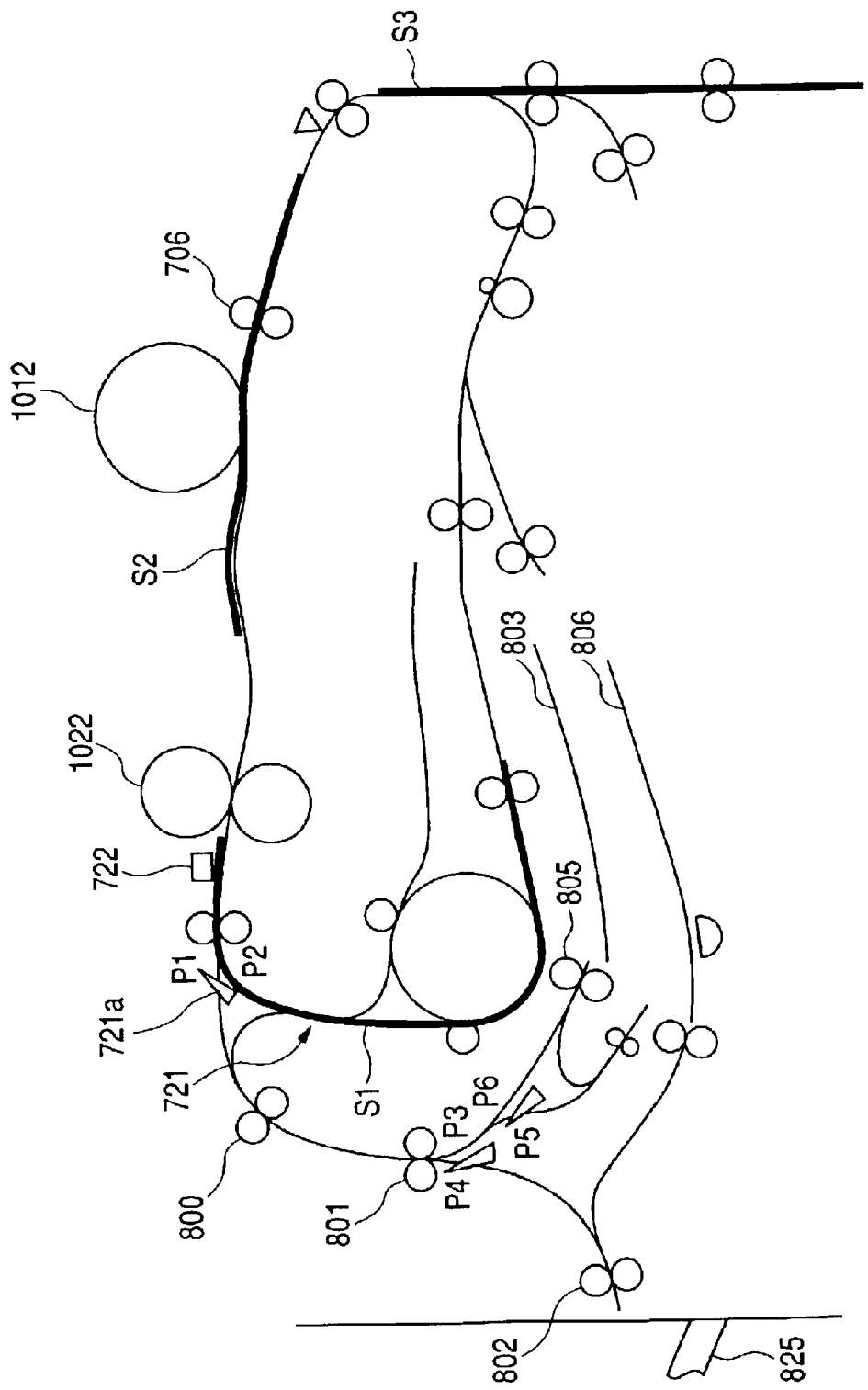
FIG. 20 is a first view illustrating the other controlling operation of the main body controlling portion provided in the copying machine main body in case of the surface reverse sheet delivery mode.

In this case, the three sheets S1, S2 and S3 continuously travel toward the registration rollers 106, and the images of the first side and the second side are formed on the sheets S1 and S2, respectively. Next, when the reading means 722 detects the abnormality of the image on the trailing edge of the sheet S passes through the fixing device 1022, the main body controlling portion 1004b judges by a timer or a sensor, not shown, that as shown in FIG. 20, the leading edge of the sheet S1 has already passed the first flapper 721a. Accordingly, thereafter, this sheet S1 is reversed by the reverse roller 715 as usual and is made to travel toward the first delivery rollers 800.

When thereafter, the first reverse flapper 721a in the position P2 causes the normal subsequent sheet S2 on which the image of the second side has been formed to pass, the trailing edge of the sheet S1 and the leading edge of the sheet S2 overlap each other and therefore, the first reverse flapper 721a is brought to the position P1. Thereby, as shown in FIG. 21, the sheet S2 also intactly enters the sheet reversing portion 721, and thereafter is reversed as usual, and then travels toward the first delivery rollers 800.

On the other hand, when the abnormality of the image on the trailing edge of the sheet S1 has been detected, the sheet S3 has not yet arrived at the image evolving position A, as shown in FIG. 20, and therefore the image of the first side formed on the sheet S1 is formed on the sheet S3. Thereafter, the sheet S3 enters the sheet reversing portion 121 subsequently to the sheets S1 and S2, and is reversed as usual, and then travels toward the first delivery rollers 800.

Figure 21:
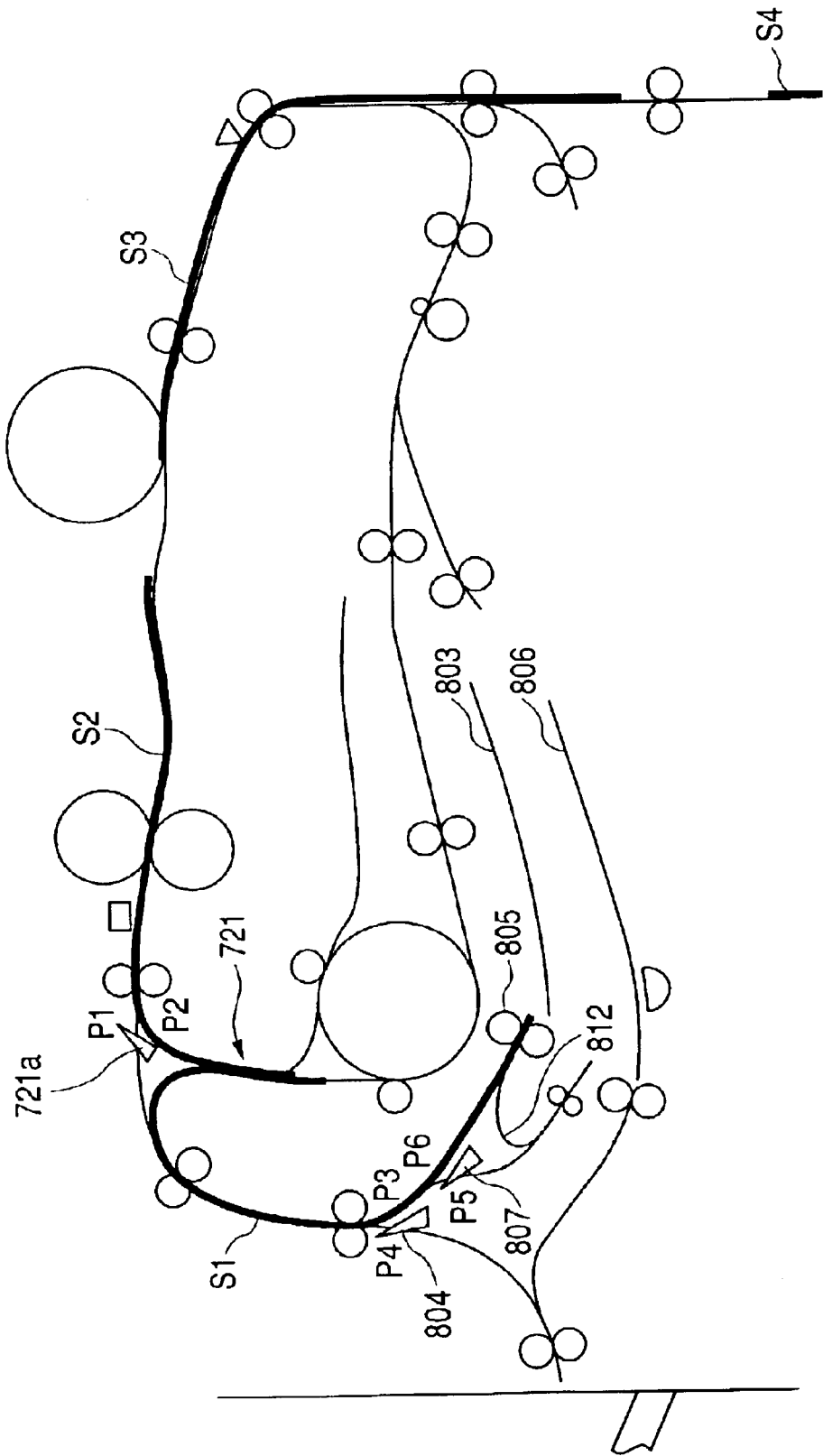
FIG. 21 is a second view illustrating the other controlling operation in case of the surface reverse sheet delivery mode.

Thereafter, as shown in FIG. 21, the second flapper 804 and the third flapper 807 assume positions P4 and P5, respectively, whereby the sheet S1 is delivered to the abnormal sheet tray 803. Also, the sheet S2 tends to be once delivered to the abnormal sheet tray 803, but the trailing edge thereof is still nipped between the abnormal sheet delivery rollers 805, and these abnormal sheet delivery rollers 805 are reversely rotated, whereby as shown in FIG. 22, the sheet S2 passes through the second sheet reversing path 812 and is delivered to the temporary stack tray 806.

Figure 23:
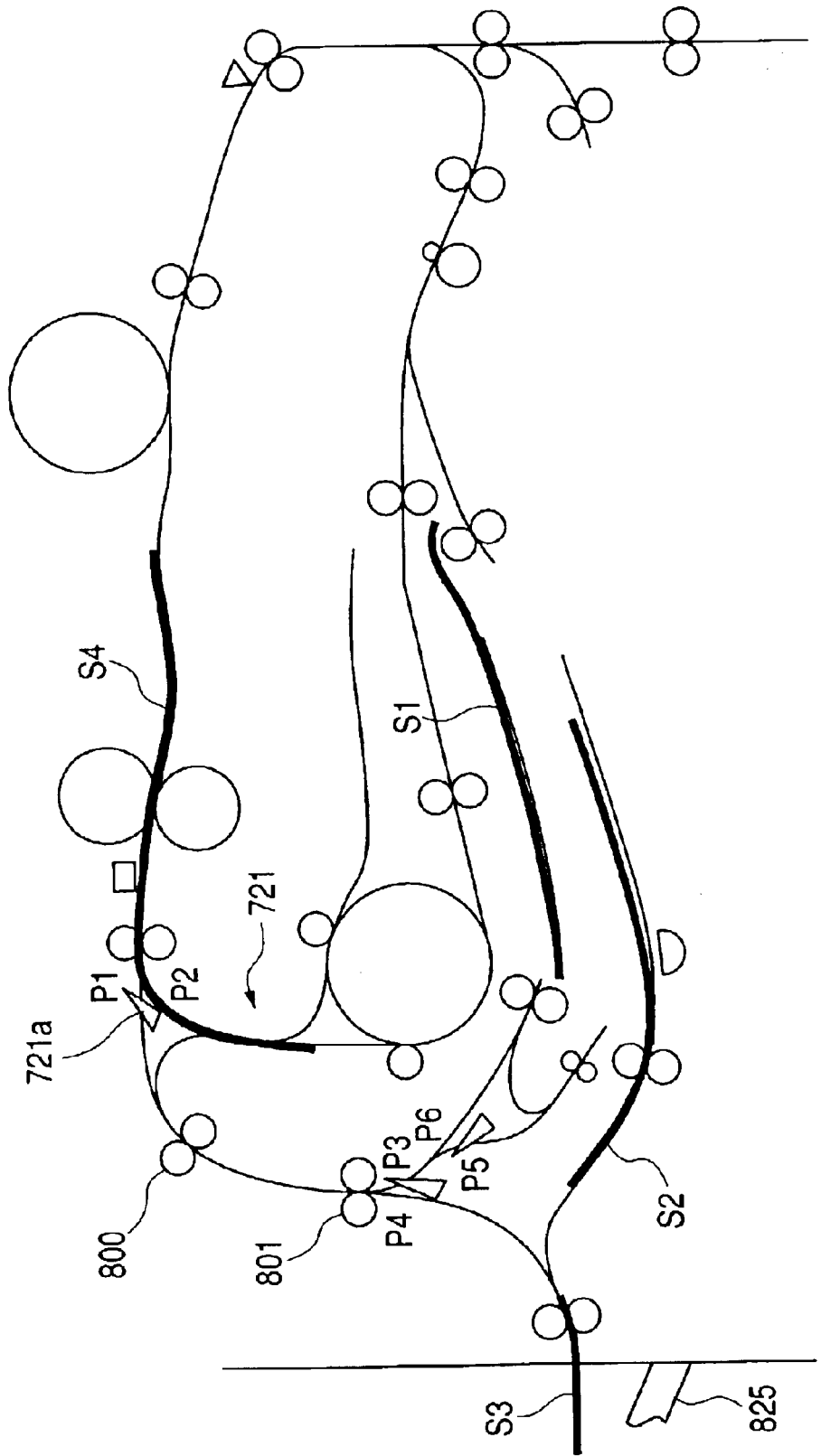
FIG. 23 is a fourth view illustrating the other controlling operation in case of the surface reverse sheet delivery mode.

Thereafter, the second flapper 804 assumes a position P3 and the sheet S3 is intactly delivered to the delivery tray 825. Also, the sheet S2 is again transferred, as shown in FIG. 23, immediately subsequently to the delivery of the sheet S3 on which the image of the first side has been formed, and is delivered to the delivery tray 825.

Figure 22:
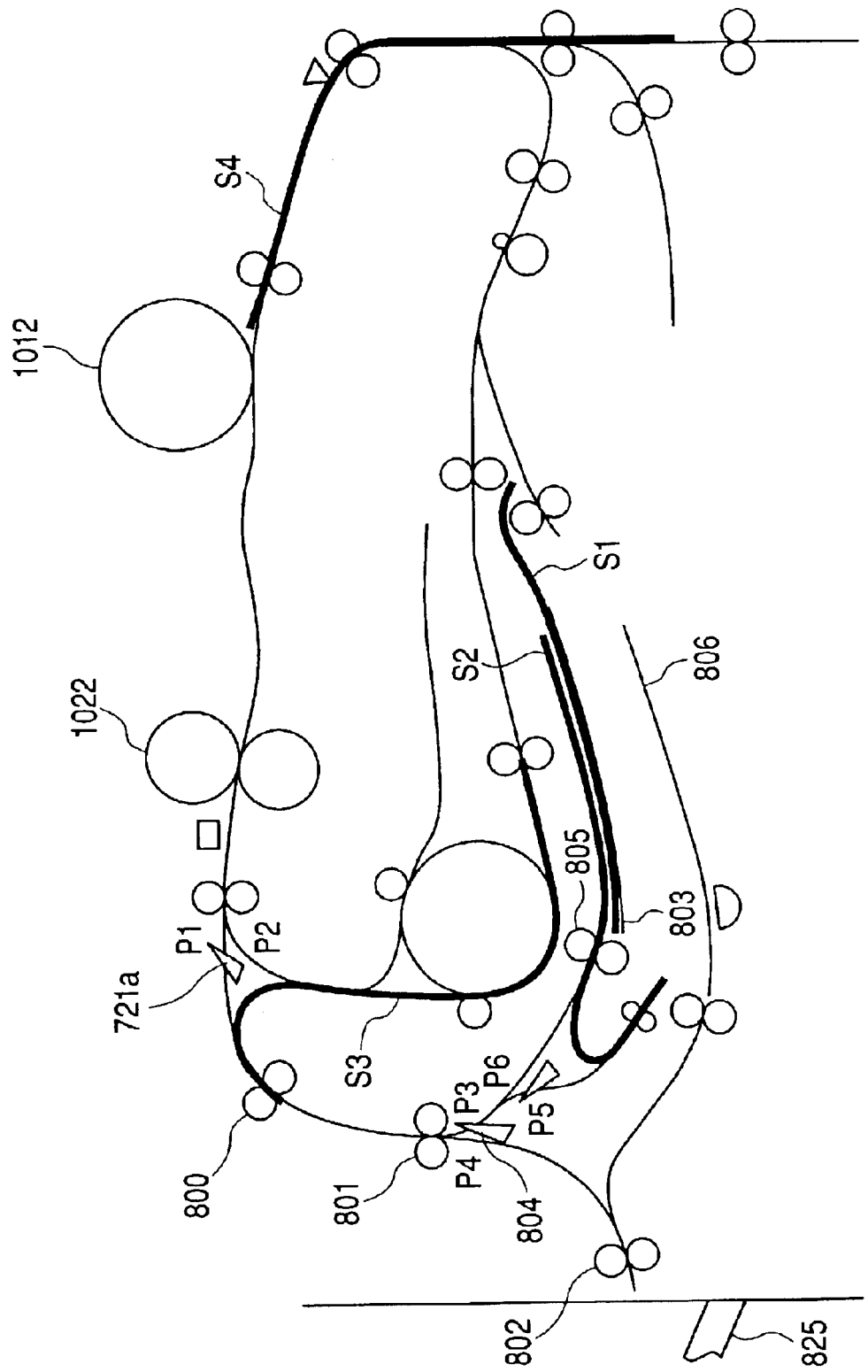
FIG. 22 is a third view illustrating the other controlling operation in case of the surface reverse sheet delivery mode.

Next, when the sheet S1 is detected as being abnormal, the image formed on the sheet S1 is formed on the sheet S3 as already described and therefore, the image of a third side which ought to have been formed on this sheet S3 is formed on a sheet S4 which is a predetermined subsequent sheet transported next to the sheet S3, as shown in FIG. 22. Thereafter, the sheet S4 on which the image of the third side has been thus formed posses through the fixing device 102 and is sent to the sheet reversing portion 721 by the first flapper 721a, as shown in FIG. 23.

Next, this sheet S4 is reversed by the sheet reversing portion 721, and thereafter is delivered to the delivery tray 825 with the image surface thereof facing down, via the first delivery rollers 800, the second delivery rollers 801 and the third delivery rollers 802 subsequently to the sheet S2.

Thus, the order of images does not go wrong, and after the detection of abnormality, the image of the first side formed on the sheet S1 is written on the sheet S3, whereby the loss time becomes smaller as compared with a case where the image of the first side is written on the sheet S4 as the substitute sheet.

Figure 24:
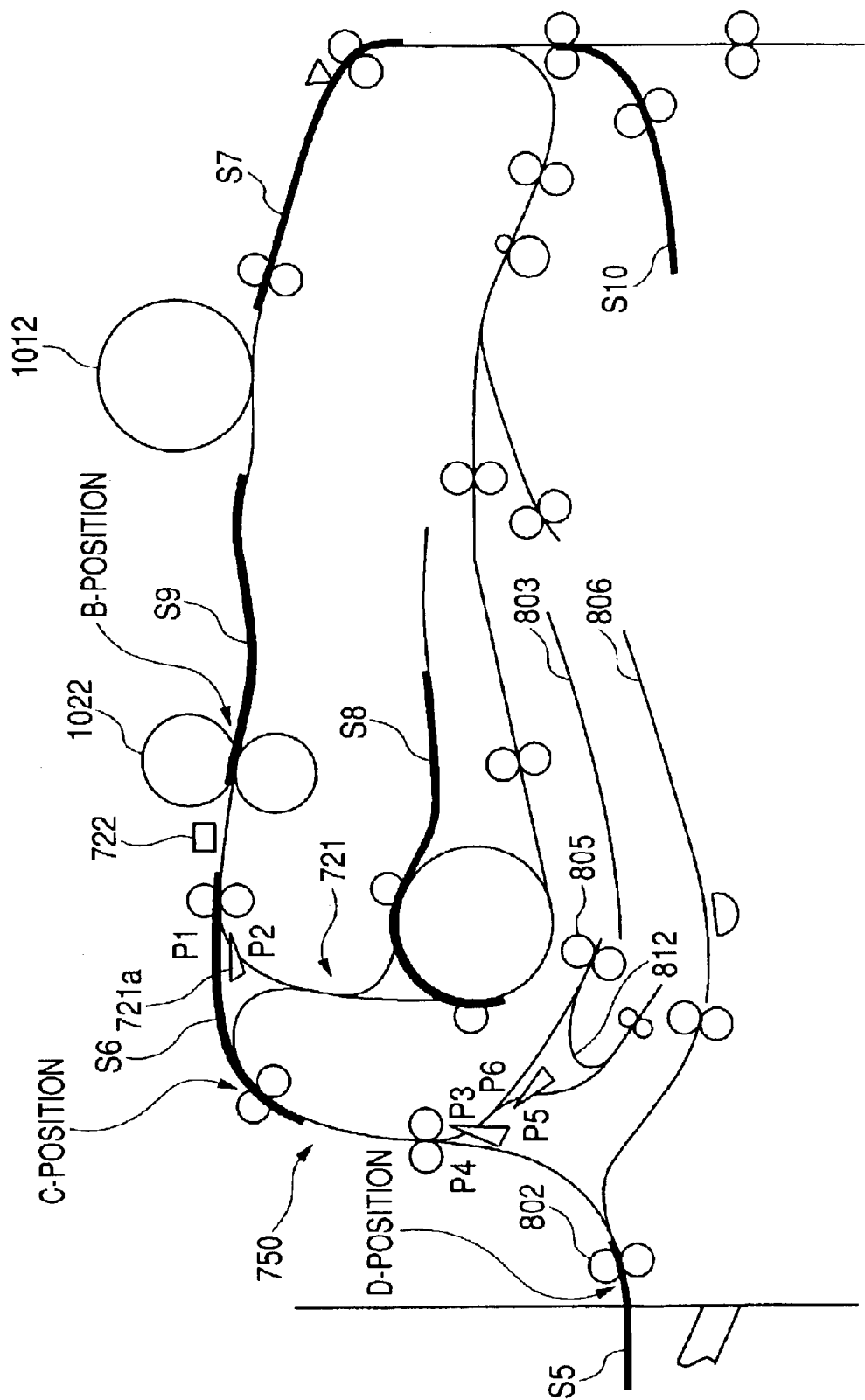
FIG. 24 is a view illustrating the controlling operation of the main body controlling portion provided in the copying machine main body in case of a two-side mode.

Description will now be made of the controlling operation when in the two-side mode wherein images are formed on a first side (front side) and a second side (back side) of a sheet, the abnormality of the image of the second side is detected. FIG. 24 shows the state of sheets in the sheet transport route in the two-side mode. In the present embodiment, a sheet on the first side of which an image is to be formed is adapted to be transported between sheets on the second sides of which images are to be formed.

In FIG. 24, S5 and S6 designate sheets on the second sides of which images have also been formed, S7 to S9 denote sheets on the second surfaces of which images are formed, and S10 designate a sheet on the first side of which an image is to be formed. Also, the image of the (2n−1)th side is formed on the first side of the nth sheet, Sn, and the image of the 2nth side is formed on the second side thereof.

Here, when for example, in the sheet S6 of the sheets on the second sides of which images have been formed, the eleventh side is O.K., but abnormality is detected in the image on the second side, i.e., the twelfth side, this sheet S6 is intactly delivered to the abnormal sheet delivery tray 805 after the detection. At this time, the first flapper 721a is in a position P2 from the beginning because this is the second side in the two-side mode.

Also, the sheet S9 subsequent to this sheet S6 enters the sheet reversing portion 721 after the image of the seventeenth side has been formed on the first side thereof, and again travels toward the image forming portion in order that the image of the eighteenth side may be formed thereon.

Further, after the image of the next thirteenth side has been formed, the sheet S7 on which the image of the fourteenth side is to be formed once travels toward the abnormal sheet tray 803 after the image of the fourteenth side has been formed thereon, whereafter the abnormal sheet delivery rollers 805 are reversely rotated, whereby the sheet S7 passes through the second sheet reversing path 812 and is delivered to the temporary stack tray 806. This operation will hereinafter be referred to as the reverse temporary stacking operation.

On the other hand, the images of the eleventh side and the twelfth side formed on the sheet S6 are formed on the sheet S10 which is the next originally predetermined subsequent sheet and on which the images of the nineteenth side and the twentieth side are to be formed as the substitute sheet for the sheet S6. During the time when the images of the eleventh side and the twelfth side are formed on this sheet S10, the preceding sheets S8 and S9, like the sheet S7, are delivered to the temporary stack tray 806 by the reverse temporary stacking operation.

Thereafter, the sheet S10 on which the image of the twelfth side has been thus formed is inspected, and if no abnormality is detected, it is thereafter delivered to the delivery tray 825. Also, after this sheet S10, the sheets contained in the temporary stack tray 806 are delivered to the delivery tray 825 in succession from the sheet S7. When an abnormality is detected in the sheet S10, the images of the eleventh side and the twelfth side formed on the sheet S6 are formed on the next sheet S11 as a substitute sheet.

Figure 25:
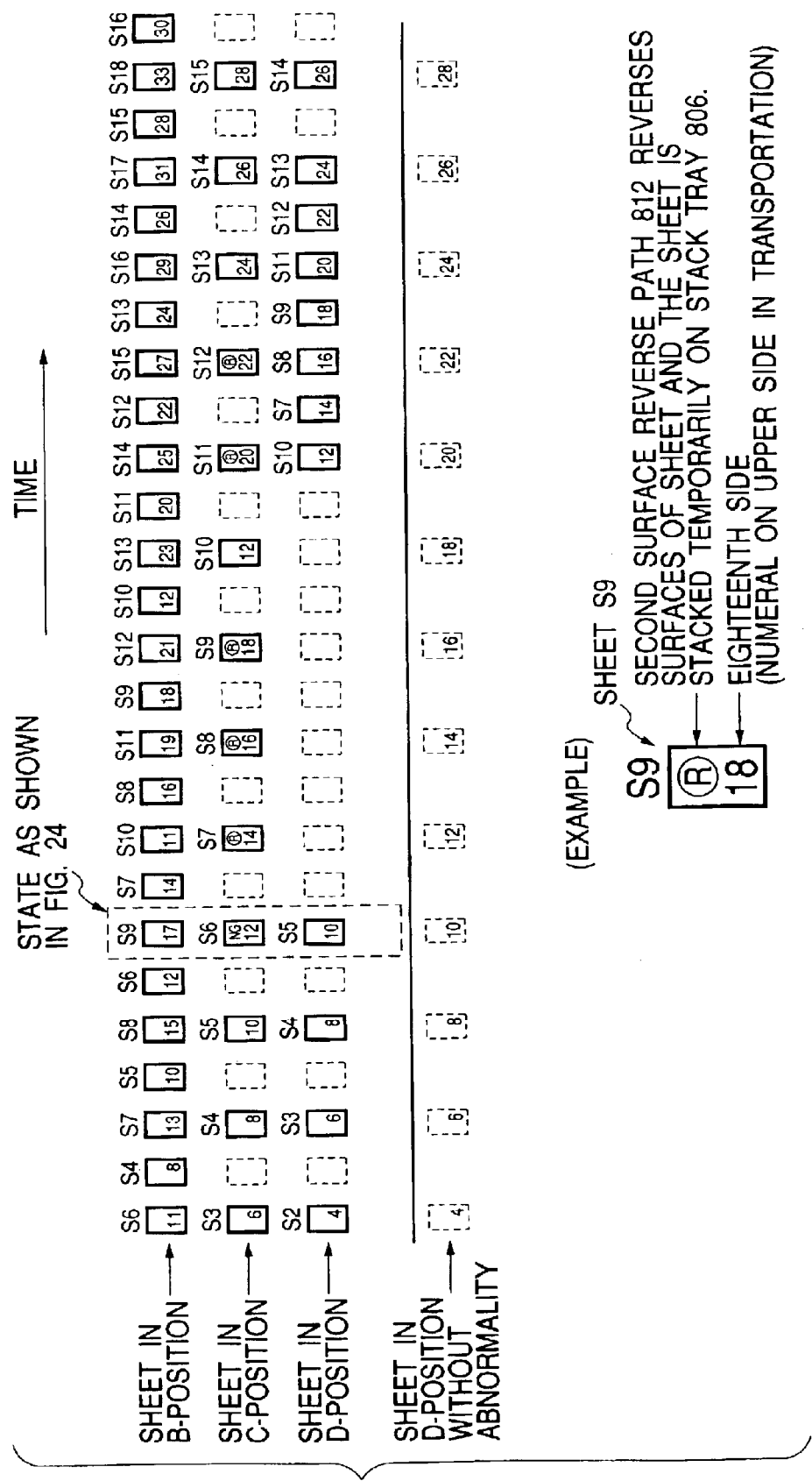
FIG. 25 illustrates the positions of a sheet in the controlling operation in case of the two-side mode.

Now, FIG. 25 shows the order of the sheets passing through B-position upstream of the fixing device 1022 shown in FIG. 24, C-position upstream of the first delivery rollers 800 and D-position downstream of the third delivery rollers 802.

In the sheet transport route of the present embodiment, as shown in FIG. 24, only five sheets at greatest can be made to exist and therefore, the sheets S11 and S12 arrive at C-position earlier than the termination of the delivery of the sheet S9. Therefore, as shown in FIG. 25, these sheets S11 and S12 are also delivered to the temporary stack tray 806 by the reverse temporary stacking operation.

At this time, the sheets S11 and S12 are delivered to the temporary stack tray 806 and at the same time, the lowermost sheet is transported from the temporary stack tray 806 to the delivery tray 825, but this path is provided below the sheet path 750 for transporting normal sheets and therefore does not intersect with the latter, and therefore delivery and re-transporting can be done without timing being taken into account.

Thereafter, the sheets S11 and S12 are delivered to the delivery tray 825. Thereafter, the sheet S13 arrives at C-position, but this sheet S13 is intactly delivered to the delivery tray 825.

Description will now be made of the controlling operation when the image of the first side in the two-side mode is detected as being abnormal.

Figure 26:
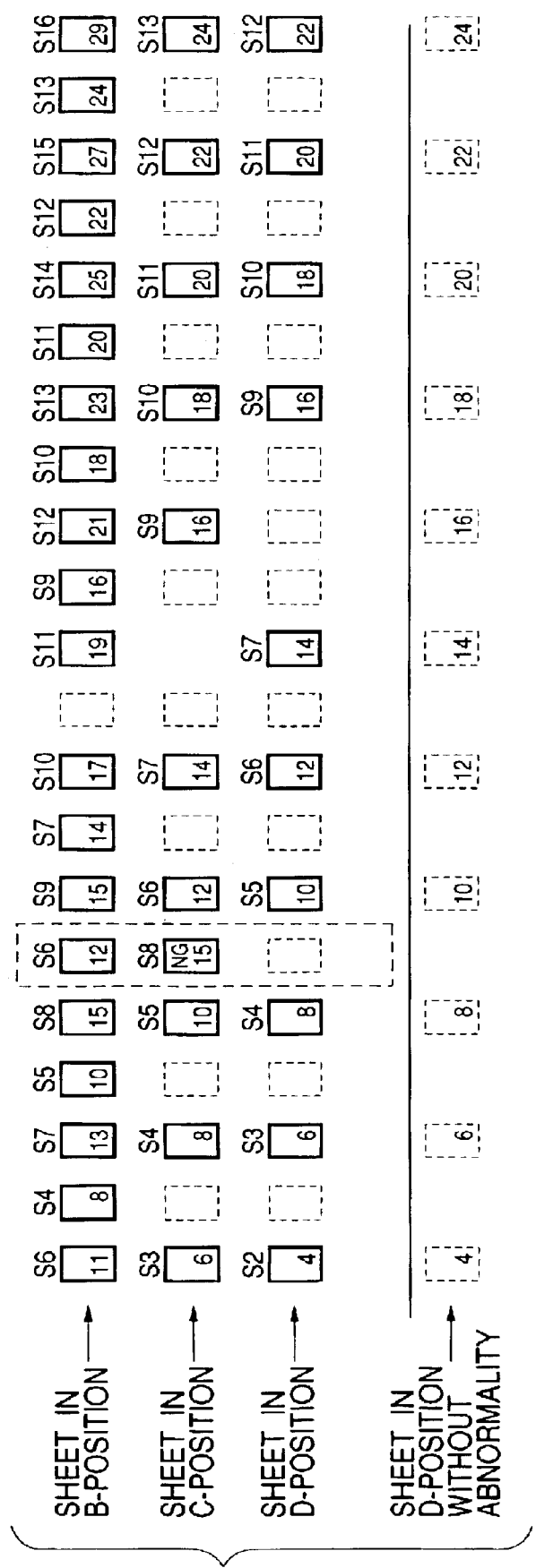
FIG. 26 is a first view illustrating the positions of a sheet in the other controlling operation in case of the two-side mode.

For example, the sheet S8 of which the fifteenth side has been detected as being abnormal, when it has not arrived at the first flapper 721a as in the aforedescribed case of reversal, passes through C-position and is delivered to the abnormal sheet delivery tray 805, as shown in FIG. 26, because the first flapper 721a is changed over the position P2 shown in FIG. 24.

Figure 27:
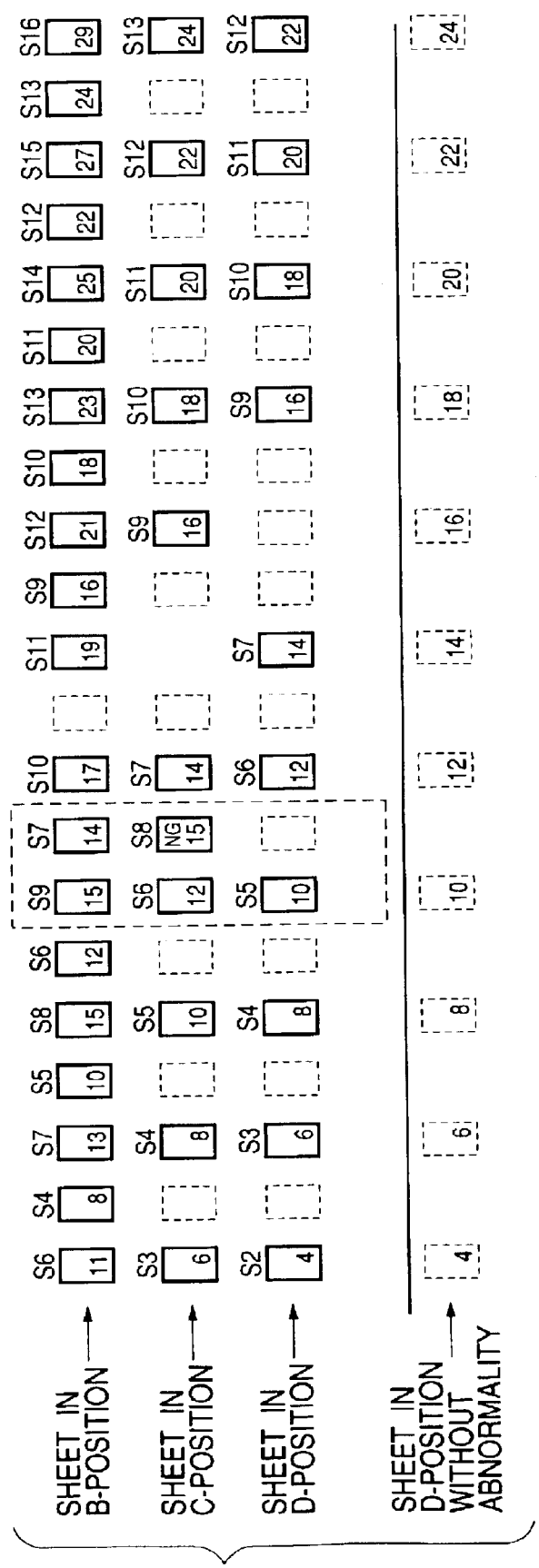
FIG. 27 is a second view illustrating the positions of a sheet in the other controlling operation in case of the two-side mode.

Also, when the sheet S8 has arrived at the first flapper 721a, the first flapper 721a is still in the position P1 and therefore, the sheet S8 once enters the sheet reversing portion 721 as in the aforedescribed case of reversal, and lets the subsequent sheet S6 on the second side of which the image of the twelfth side has been formed precede as shown in FIG. 27, and thereafter is sent to the first delivery rollers 800, and the sheet S alone is delivered to the abnormal sheet delivery tray 805.

In these cases, if the next sheet S9 on the first side of which the image of the seventeenth side is formed has not arrived at the image evolving position A, the contents scheduled to be formed on the sheet S8, i.e., the images of the fifteenth side and the sixth side, are formed on this sheet S9.

Figure 28:
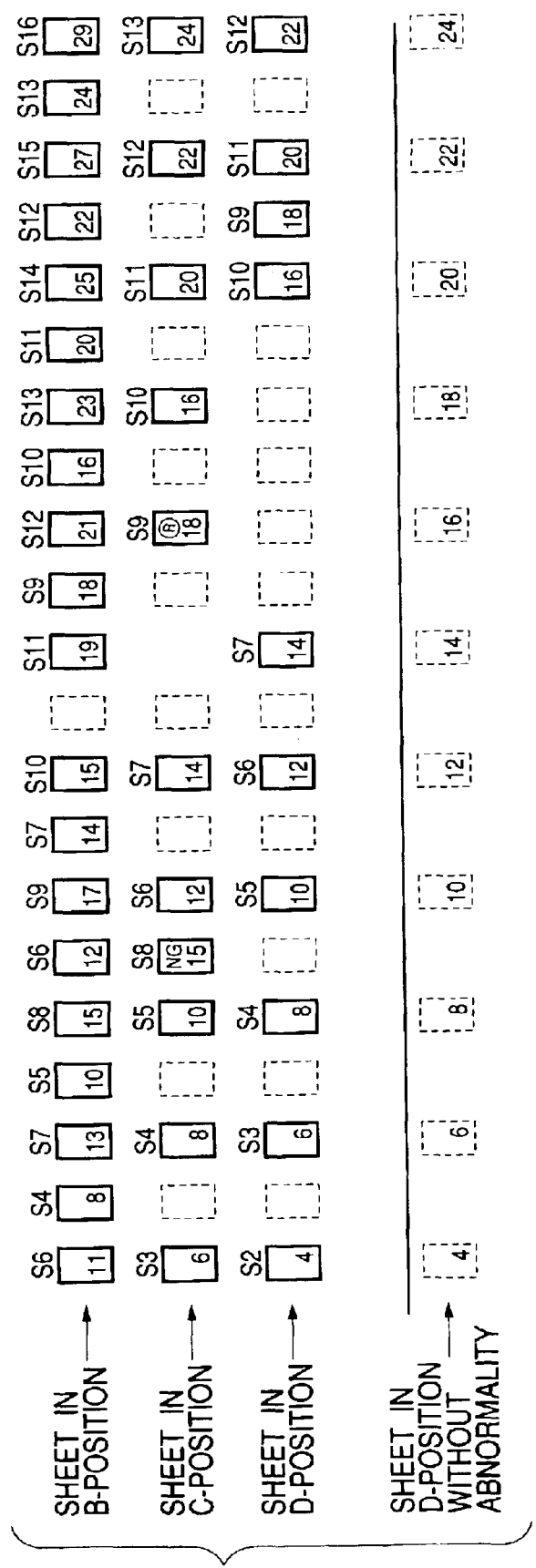
FIG. 28 is a third view illustrating the positions of a sheet in the other controlling operation in case of the two-side mode.

Also, if the sheet S9 has arrived at the image evolving position A, the images of the seventeenth side and the eighteenth side scheduled to be formed on the sheet S9 are formed on the sheet S9, and the images of the fifteenth side and the sixteenth side scheduled to be formed on the sheet S8 are formed on the next sheet S10. In this case, the sheet S9, after the image of the second side has been formed thereon, is delivered to the temporary stack tray 806 as shown in FIG. 28, and is delivered to the delivery tray 825 subsequently to the sheet S10.

As described above, design is made such that when an abnormal sheet is detected, the abnormal sheet is delivered to the abnormal sheet tray 803 and normal sheets under transport are once delivered to the temporary stack tray 806 and further, a substitute sheet is delivered, whereafter the normal sheets are delivered from the temporary stack tray 806, whereby the order of delivery is correct, and as is apparent from the difference between the sheet in the D-position of FIG. 25 and the sheet in D-position when there is no abnormality, the delivered sheets can be recovered with only the delay of one sheet.

While in the present embodiment, description has been made of an example in which the sheets are delivered to the delivery tray 825, the sheet treating apparatus may be disposed sideways of the copying machine main body 1000A so that the sheets may be delivered to this sheet treating apparatus.

As described above, when an abnormal sheet occurs as in the present invention, the abnormal sheet is contained in an abnormal sheet containing portion, whereby the abnormal sheet can be eliminated. Also, the image forming portion is controlled so that an image formed on the abnormal sheet may be formed on a predetermined sheet subsequent to the abnormal sheet, and is further controlled so that after the abnormal sheet has been contained in the abnormal sheet containing portion, a normal sheet between the abnormal sheet and the predetermined subsequent sheet may be contained in a normal sheet containing portion, and after the predetermined subsequent sheet has been delivered, the normal sheet contained in the normal sheet containing portion may be delivered, whereby the recovery of the eliminated abnormal sheet can be automatically accomplished.

What is claimed is:

1. An image forming apparatus adapted to form an image on a sheet by an image forming portion, and thereafter detect the presence or absence of an abnormality of the sheet on which the image has been formed, said image forming apparatus comprising:

abnormality detecting means for detecting the abnormality of the sheet;

an abnormal sheet containing portion for containing therein the sheet of which the abnormality has been detected by said abnormality detecting means;

a normal sheet containing portion for temporarily containing therein a normal sheet of which the abnormality has not been detected by said abnormality detecting means; and a controlling portion for controlling said image forming portion so that the abnormal sheet of which the abnormality has been detected by said abnormality detecting means may be contained in said abnormal sheet containing portion, and that an image formed on the abnormal sheet may be formed on a predetermined subsequent sheet subsequent to the abnormal sheet, wherein said controlling portion controls so that the normal sheet between the abnormal sheet and the predetermined subsequent sheet may be contained in said normal sheet containing portion after the abnormal sheet is contained in said abnormal sheet containing portion, and the normal sheet contained in said normal sheet containing portion may be delivered after the predetermined subsequent sheet has been delivered.

2. An image forming apparatus according to claim 1, wherein said abnormality detecting means has reading means for reading the information of the sheet, and comparing means for comparing the information of the sheet read by said reading means and the information of a sheet inputted in advance with each other, and a result of the comparison is outputted to said controlling portion.

3. An image forming apparatus according to claim 2, wherein said reading means reads information regarding at least one of the configuration and color of the sheet, an image formed on the sheet and sheet thickness information.

4. An image forming apparatus according to claim 1, further comprising:

a sheet path in which said abnormality detecting means is provided;

an abnormal sheet path branching off from said sheet path for transporting the abnormal sheet to said abnormal sheet containing portion;

first changeover means provided at a branch-off point between said sheet path and said abnormal sheet path for guiding the abnormal sheet to said abnormal sheet path;

a normal sheet path branching off from said sheet path or said abnormal sheet path for transporting the normal sheet to said normal sheet containing portion; and second changeover means provided at a branch-off point between said sheet path or said abnormal sheet path and said normal sheet path for guiding the abnormal sheet to said abnormal sheet path, wherein said controlling portion controls said first changeover means and said second changeover means so that the abnormal sheet of which the abnormality has been detected by said abnormality detecting means may be contained in said abnormal sheet containing portion, and the normal sheet between the abnormal sheet and the predetermined subsequent sheet may be contained in said normal sheet containing portion.

5. An image forming apparatus according to claim 4, wherein a branch-off point between said sheet path and said abnormal sheet path is at a location distant by a maximum supplied sheet length or greater from said reading means.

6. An image forming apparatus according to claim 1, wherein said abnormal sheet containing portion is provided so that the abnormal sheet contained therein may be exposed to the outside.

7. An image forming apparatus according to claim 1, wherein said normal sheet containing portion is disposed so that the normal sheet contained in said normal sheet containing portion, when delivered, may again pass said abnormality detecting means.

8. An image forming apparatus according to claim 1, further comprising an inserter for containing therein a sheet not to be passed through said image forming portion, and wherein the presence or absence of the abnormality of the sheet contained in said inserter is detected by said abnormality detecting means.

9. An image forming apparatus according to claim 1, further comprising a sheet treating apparatus for treating the delivered sheet.

10. An image forming apparatus according to claim 9, wherein an inspection device having said abnormality detecting means is provided discretely from an image forming apparatus main body so that the sheet may be transported from said discretely provided inspection device to said sheet treating apparatus.

11. An image forming apparatus according to claim 1, wherein an operation of said image forming portion is stopped when the number of times of recovery for forming on the predetermined subsequent sheet an image formed on the abnormal sheet detected by said abnormality detecting means has reached a predetermined number of times.

12. An image forming apparatus according to claim 11, wherein said predetermined number of times of the recovery for stopping the operation of said image forming portion is changeably set.

13. An image forming apparatus according to claim 1, further comprising:

a first sheet reversing path for reversing and delivering the sheet on which the image has been formed in said image forming portion; and a second sheet receiving path disposed downstream of said first sheet reversing path with respect to a sheet transporting direction, wherein said abnormal sheet containing portion and said normal sheet containing portion are disposed downstream of said first sheet reversing path with respect to the sheet transporting direction, and said controlling portion causes the sheet to be reversed and delivered by said first sheet reversing path when said abnormality detecting means does not detect an abnormality, and causes the abnormal sheet to be transported to said abnormal sheet containing portion and the normal sheet to be transported to said normal sheet containing portion without the sheet being reversed by said first sheet reversing path and causes the normal sheet to be reversed and delivered by said second sheet reversing path when said abnormality detecting means detects an abnormality.

14. An image forming apparatus according to claim 13, wherein said abnormal sheet containing portion and said normal sheet containing portion are disposed parallel to each other, and said second sheet reversing path is disposed between said abnormal sheet containing portion and said normal sheet containing portion.

15. An image forming apparatus according to claim 13, further comprising a re-feeding path for again transporting the sheet reversed by said first sheet reversing path to said image forming portion.

16. An image forming apparatus according to claim 1, further comprising:

a first sheet reversing path for reversing and delivering the sheet on which the image has been formed in said image forming portion; and a second sheet reversing path disposed downstream of said first sheet reversing path with respect to a sheet transporting direction, wherein said abnormal sheet containing portion and said normal sheet containing portion are disposed downstream of said first sheet reversing path with respect to the sheet transporting direction, and said controlling portion causes the sheet to be reversed and delivered by said first sheet reversing path when said abnormality detecting means does not detect an abnormality and when said abnormality detecting means detects an abnormality on the trailing edge side of the sheet, and causes the abnormal sheet to be transported to said abnormal sheet containing portion and the normal sheet to be transported to said normal sheet containing portion without the sheet being reversed by said first sheet reversing path, and causes the normal sheet to be reversed and delivered by said second sheet reversing path when said abnormality detecting means detects an abnormality on the leading edge side of the sheet.

17. An image forming apparatus according to claim 1, further comprising a display portion for displaying the history of abnormality detection by said abnormality detecting means.

* * * * *

UNITED STATES PATENT AND TRADEMARK OFFICE
CERTIFICATE OF CORRECTION

PATENT NO. : 6,804,473 B2
DATED : October 12, 2004
INVENTOR(S) : Tomokazu Nakamura et al.

It is certified that error appears in the above-identified patent and that said Letters Patent is hereby corrected as shown below:

Column 1,
Line 21, "is" should read -- it --.

Column 5,
Line 29, "reading" (1$^{st}$ occurrence) should read -- a reading --.

Column 10,
Line 10, "different" should read -- difference --.
Line 30, "arrives" should read -- arrives at --.
Line 39, "a" should read -- as --.

Column 11,
Line 57, "there" should read -- it --.

Column 14,
Line 10, "and controls," should be deleted.
Line 54, "delivery" should read -- delivery of --.

Column 17,
Line 3, "posses" should read -- passes --.

Signed and Sealed this

First Day of February, 2005

JON W. DUDAS
*Director of the United States Patent and Trademark Office*